United States Patent
Kobayashi et al.

(10) Patent No.: US 7,724,883 B2
(45) Date of Patent: May 25, 2010

(54) TELEPHONE SYSTEM FOR COMMUNICATION THROUGH MULTIPLE LINES

(75) Inventors: Fumiaki Kobayashi, Yamatokoriyama (JP); Tatsuya Nishio, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1035 days.

(21) Appl. No.: 11/033,879

(22) Filed: Jan. 13, 2005

(65) Prior Publication Data

US 2005/0176446 A1 Aug. 11, 2005

(30) Foreign Application Priority Data

Jan. 16, 2004 (JP) ............... 2004-009320

(51) Int. Cl.
*H04M 1/00* (2006.01)
(52) U.S. Cl. ...................... 379/164; 379/165
(58) Field of Classification Search ............ 379/100.12, 379/142.07, 156, 164, 165
See application file for complete search history.

(56) References Cited

U.S. PATENT DOCUMENTS 5,742,596 A * 4/1998 Baratz et al. ................ 370/356
5,983,282 A * 11/1999 Yucebay ..................... 709/249
6,208,868 B1 * 3/2001 Kim ........................... 455/463

FOREIGN PATENT DOCUMENTS

| JP | 6-58635 U | 8/1994 |
| JP | 7-046662 A | 2/1995 |
| JP | 2001-308877 A | 11/2001 |
| JP | 2002-78010 A | 3/2002 |

* cited by examiner

*Primary Examiner*—Alexander Jamal
(74) *Attorney, Agent, or Firm*—Birch, Stewart, Kolasch & Birch, LLP

(57) ABSTRACT

A telephone system communicating through a plurality of external telephone lines includes base phones connected to respective ones of the plurality of telephone lines and a cable connected so as to allow communication among a plurality of terminals. Each base phone includes a dual-line adaptation function unit for establishing communication through the plurality of telephone lines and a single-line adaptation function unit for establishing communication through a telephone line connected to the base phone itself. Any one of the dual-line adaptation function unit and the single-line adaptation function unit is selectively enabled in response to an external operation. Therefore, the single base phone attains a function as a single-line-adapted model establishing communication through the telephone line connected to the base phone itself or a multiple-line-adapted model establishing communication through the plurality of telephone lines.

23 Claims, 15 Drawing Sheets

HANDSET TO BASE PHONE (COMMUNICATION BETWEEN HANDSETS)

BASE PHONE TO HANDSET (COMMUNICATION BETWEEN HANDSETS)

SYSTEM ID DISTRIBUTION WHEN HANDSET IS ADDITIONALLY PROVIDED (BASE PHONE TO HANDSET)

SYSTEM ID RECEPTION WHEN HANDSET IS ADDITIONALLY PROVIDED (HANDSET TO BASE PHONE)

_US 7,724,883 B2_

TELEPHONE SYSTEM FOR COMMUNICATION THROUGH MULTIPLE LINES

This nonprovisional application is based on Japanese Patent Application No. 2004-009320 filed with the Japan Patent Office on Jan. 16, 2004, the entire contents of which are hereby incorporated by reference.

FIELD OF THE INVENTION

The present invention relates to a telephone system, and more particularly to a telephone system attaining a function to control communication through a plurality of lines connected for communication with a device outside a system (referred to as a multiple-line adaptation function).

The telephone system may be adapted to a system transmitting/receiving a digital signal or a system transmitting/receiving an analog signal.

DESCRIPTION OF THE BACKGROUND ART

A cordless telephone system and a FAX (abbreviation of facsimile) terminal attaining a dual-line adaptation function in a single unit (a function to control communication through two connected lines) are provided. These terminals attain simultaneous communication through two lines using a plurality of separate handsets, by containing two RF (Radio Frequency) communication modules in a base phone. Here, the cordless telephone system refers to a system allowing wireless communication between an apparatus for connection to an external line (base phone) and a telephone (handset).

Some conventional base phones with a dual-line adaptation function have a FAX function as a resource, however, one base phone has only one such resource. Therefore, if a request for calling a FAX function is made through one line while the FAX function operates in the other line, it has been impossible to respond to this request. As a result, exclusive processing of the request for calling the FAX function has been unavoidable.

Similarly, as to an answering and recording function (a function for recording and receiving a message, automatically actuated when a telephone call arrives), a cordless telephone allowing simultaneous recording through two lines has also been proposed. This is achieved by incorporating two different units responsible for the answering and recording function into the base phone. Therefore, a unit price of the base phone has been high.

In addition, a technique for operating a system for integrating two different communication networks has also been proposed (see Japanese Patent Laying-Open No. 2001-308877).

As the conventional base phone with a dual-line adaptation function includes two RF communication modules, the unit price has been high and not economical. Moreover, demand for a terminal (base phone) itself attaining the dual-line adaptation function has not been considerably great. Accordingly, when a terminal is developed as a dedicated dual-line-adapted model, depreciation of development cost has been difficult.

In addition, as compared with the base phone attaining a single-line adaptation function (a function to control communication through a single connected line), selection of products has been poor and user's choice has been limited. In the case of the terminal attaining the single-line adaptation function, the base phone including a resource of a type required by the user (such as a FAX function, an answering and recording function, or the like) may not be provided.

When a cordless telephone set A attaining the single-line adaptation function (implemented by a base phone A and a handset group A) is simply connected to Line (line) 1 and a cordless telephone set B attaining the single-line adaptation function (implemented by a base phone B and a handset group B) is simply connected to Line (line) 2, the following limitation is imposed.

First, it is assumed that a calling request is issued to one of Lines 1 and 2. If the calling request comes through Line 1, solely base phone A and handset group A make ringing sounds, and they have been unable to call telephone set B. In contrast, if the calling request comes through Line 2, solely base phone B and handset group B make ringing sounds, and they have been unable to call telephone set A.

In addition, if one of lines 1 and 2 is busy (for example, Line 1 is busy and Line 2 is idle (unused)), the terminal in telephone set A (base phone A or handset group A) cannot establish communication using Line 2. On the other hand, if Line 2 is busy and Line 1 is idle, communication from the terminal in telephone set B (base phone B or handset group B) using Line 1 is not allowed.

As to a call transfer function/INTERCOM (extension call) function, calling and call transfer from the terminal in telephone set A to the terminal in telephone set B through INTERCOM is not allowed, or calling and call transfer from the terminal in telephone set B to the terminal in telephone set A through INTERCOM is not allowed.

In the base phone incorporating resources such as one FAX function and one answering and recording function respectively, if requests for use of an identical resource are simultaneously made through both of Lines 1 and 2, only one request can be responded, because there is only one resource available. For example, when a calling request for FAX communication from Line 2 arrives during FAX communication through Line 1, a response to Line 2 is caused to wait until the FAX communication through Line 1 is completed. Though two resources of the same type may be prepared in order to avoid such a situation, a unit price for each of base phones A and B tends to be inevitably high.

SUMMARY OF THE INVENTION

An object of the present invention is to provide a telephone system attaining a multiple-line adaptation function with low cost.

In order to achieve the above-mentioned object, a telephone system communicating through a plurality of external telephone lines according to one aspect of the present invention includes: a plurality of terminals connected to the plurality of telephone lines respectively; and a communication path for connecting the plurality of terminals so as to allow communication between them. Each of the plurality of terminals includes a multiple-line adaptation unit for establishing communication through the plurality of telephone lines using the communication path, and a single-line adaptation unit for establishing communication through the telephone line connected to the terminal itself, without using the communication path. In response to an external operation, any one of the multiple-line adaptation unit and the single-line adaptation unit is selectively enabled.

Therefore, the terminal itself can attain a function as the single-line-adapted model for establishing communication through the telephone line connected to the terminal itself or a multiple-line-adapted model for establishing communication through the plurality of telephone lines, solely by the external operation.

That is, independent development of the terminal of the multiple-line-adapted model is no longer necessary, and high unit price of the terminal itself can be avoided. In addition, demand from a user can be satisfied simply by using one terminal or by using a plurality of terminals, depending on his/her necessity of the single-line adaptation function or the multiple-line adaptation function.

Preferably, each of the plurality of terminals further includes an additional function unit. When a plurality of requests for use of the additional function unit arrive through the plurality of telephone lines while the multiple-line adaptation unit is enabled, the plurality of requests for use are processed in the plurality of terminals by the additional function unit respectively.

Therefore, even if a plurality of requests for use of the additional function unit arrive through the plurality of telephone lines, each request for use can individually be processed by the additional function unit in each terminal.

That is, even if requests for use of the additional function unit conflict with each other, all requests for use can quickly be processed without delay.

Preferably, the telephone system further includes at least one handset establishing wireless communication with the plurality of terminals, using the plurality of terminals as base phones respectively.

Therefore, in the telephone system described above, even if a plurality of call requests arrive through the plurality of telephone lines, the call requests can be processed by the plurality of handsets connected to the terminals via wireless communication respectively.

Preferably, the multiple-line adaptation unit connects any one of the plurality of telephone lines to the handset so as to allow communication therebetween, when a line connection request is received from the handset.

Therefore, when the handset transmits the request for line connection to the telephone line, the multiple-line adaptation unit connects any one of the plurality of telephone lines to the handset so as to allow communication therebetween. That is, even if a plurality of telephone lines are connected, the handset can communicate through any external telephone line, without designating the telephone line to be connected.

Preferably, the line connection request described above includes information for designating a line. The multiple-line adaptation unit in each of the plurality of terminals connects the telephone line to the handset so as to allow communication therebetween, when the line designation information of the received line connection request designates the telephone line connected to the terminal including the multiple-line adaptation unit.

Therefore, when the request for line connection to the telephone line is transmitted from the handset, the multiple-line adaptation unit connects the telephone line out of the plurality of telephone lines designated by the multiple-line adaptation unit to the handset so as to allow communication therebetween. Then, the handset can designate the telephone line to be used for communication out of the plurality of telephone lines.

Preferably, each of the plurality of terminals and each of the handsets have an identifier used for authentication in communication allotted, so that communication between instruments having a common identifier is allowed.

Therefore, solely communication between the instruments (the terminal or the handset) having the common identifier is allowed, and communication with the instrument not having the common identifier outside the telephone system is not allowed. Accordingly, interference between different telephone sets can be avoided.

Preferably, when the multiple-line adaptation unit is enabled in the plurality of terminals, all of the plurality of terminals and all of the handsets have the common identifier allotted.

Therefore, when the single-line adaptation unit is enabled, all of the plurality of terminals and all of the handsets do not have the common identifier allotted. On the other hand, when the multiple-line adaptation unit is enabled instead of the single-line adaptation unit, all of the plurality of terminals and all of the handsets have the common identifier.

Preferably, each of the plurality of terminals has a different identifier allotted when the single-line adaptation unit is enabled.

Therefore, if the telephone system includes one terminal having the single-line adaptation unit enabled, different identifiers are allotted to different telephone systems. Accordingly, interference between the telephone systems can be avoided.

Preferably, when the multiple-line adaptation unit is enabled in each of the plurality of terminals, any one of the plurality of terminals is designated as master and other terminal is designated as slave. The terminal further includes a master identifier transmission unit for transmitting the identifier allotted to the terminal itself when the terminal is designated as master, and a slave identifier update unit for updating an original identifier allotted to the terminal itself so as to indicate the identifier received from the master identifier transmission unit when the terminal is designated as slave.

Therefore, when the multiple-line adaptation unit is enabled in each of the plurality of terminals, the identifier of the terminal designated as master can be commonly used as the identifier for all of the plurality of terminals, by means of the master identifier transmission unit and the slave identifier update unit, without manual setting.

Preferably, the terminal further includes a slave identifier transmission unit for transmitting the identifier received from the master identifier transmission unit to at least one handset having an identifier the same as the original identifier allotted to the terminal itself allotted when the terminal is designated as slave. The handset includes a handset identifier update unit for receiving the identifier transmitted by the slave identifier transmission unit and updating the original identifier allotted to the terminal itself so as to indicate the received identifier.

Therefore, when the multiple-line adaptation unit is enabled in each of the plurality of terminals, the identifier of the terminal designated as master can be commonly used as the identifier for all handsets of the terminal designated as slave, by means of the master identifier transmission unit, the slave identifier transmission unit, and the handset identifier update unit, without manual setting. As a result, the common identifier, that is, the identifier allotted to the master terminal can be allotted to the terminals designated as master and slave respectively and the handsets of all terminals.

Preferably, the terminal further includes an identifier recovering unit for recovering the identifier allotted to the terminal itself to its original identifier, when the single-line adaptation unit is enabled instead of the multiple-line adaptation unit after the terminal is designated as slave.

Therefore, when the single-line adaptation unit is enabled instead of the multiple-line adaptation unit, the terminal that has been designated as slave can recover its original identifier, that is, the identifier before the identifier allotted to the master terminal is commonly used. Accordingly, even if enablement of the multiple-line adaptation unit and the single-line adaptation unit is switched, manual setting of the identifier is not necessary.

Preferably, when an unused line connection request with regard to an unused line is received from the handset, the multiple-line adaptation unit in the terminal designated as master connects the unused telephone line detected out of the plurality of telephone lines to the handset so as to allow communication therebetween.

Therefore, the terminal designated as master receives the unused line connection request from the handset, and operates so as to connect the detected unused telephone line to the handset so as to allow communication therebetween. Accordingly, the terminal designated as slave is released from such an operation, and can engage in other processing.

Preferably, the unused line connection request includes line selection instruction information for instructing a line to be selected. When it is detected that there are at least two unused telephone lines, the multiple-line adaptation unit in the terminal designated as master connects the telephone line selected based on the line selection instruction information of the unused line connection request received from the handset to the handset so as to allow communication therebetween.

Therefore, when the terminal designated as master receives the unused line connection request from the handset, the telephone line to be connected to the handset can be selected based on the line selection instruction information of the unused line connection request, even if two or more unused telephone lines are detected.

Preferably, the multiple-line adaptation unit in the terminal designated as master receives notification indicating whether or not the telephone line connected to the terminal is being used from each terminal designated as slave.

Therefore, when the terminal designated as master receives the unused line connection request from the handset, whether or not there is an unused telephone line for responding to the unused line connection request can be detected based on the notification as to whether or not the telephone line is being used, received from each terminal designated as slave.

Preferably, each handset includes a storage unit for storing handset data for identifying itself and instrument data for specifying an originator handset and a destination handset.

Therefore, for communicating with a desired handset, the handset can specify the originator using the handset data and specify the destination with the instrument data, so as to communicate with the desired handset.

Preferably, when the handset is newly registered in the telephone system, the terminal designated as master transmits a command for allotting the handset data to the handset newly registered.

Therefore, if the handset is newly added to the telephone system, the handset data of the handset can automatically be allotted, not manually.

Preferably, when the handset is newly registered in the telephone system, the terminal designated as master transmits a command for allotting the common identifier to the handset newly registered.

Therefore, when the handset is newly registered in the telephone system having the multiple-line adaptation unit enabled, a common identifier is transmitted and allotted to the handset.

Accordingly, if the handset is newly added to the telephone system, the identifier of the handset can automatically be allotted, not manually.

Preferably, when the multiple-line adaptation unit is enabled, any one of the plurality of terminals is designated as master and other terminal is designated as slave. The terminal further includes a first master side handset data transmission unit for transmitting the handset data of at least one handset having an identifier the same as the identifier allotted to the terminal itself allotted when the terminal is designated as master, and a first slave side handset data transmission unit for transmitting the handset data received from the first master side handset data transmission unit in other terminal to at least one handset having an identifier the same as the original identifier allotted to the terminal itself allotted when the terminal is designated as slave. The handset includes a first instrument data update unit for updating the instrument data in the storage unit so as to include the handset data received from the first slave side handset data transmission unit.

Therefore, when the multiple-line adaptation unit is enabled, the handset data of each handset of the master terminal is distributed to each handset of the slave terminal by means of the first master side handset data transmission unit and the first slave side handset data transmission unit. In each handset, the first instrument data update unit carries out updating such that the instrument data in the storage unit includes the handset data of each handset of the master terminal.

Accordingly, when the multiple-line adaptation unit is enabled, each handset of the slave terminal refers to the updated instrument data in the storage unit, so that handset data of all handsets of the master terminal and the slave terminal can be checked.

Preferably, the first slave side handset data transmission unit includes a comparison unit for comparing the handset data received from the first master side handset data transmission unit with handset data of at least one handset having an identifier the same as an original identifier allotted to the terminal itself allotted, and a duplication resolving unit for resolving duplication of the handset data when a result of comparison by the comparison unit indicates allotment of the same handset data to different handsets.

Therefore, when the multiple-line adaptation unit is enabled and when the identical handset data is allotted to different handsets in a duplicated manner, such duplication is resolved by the duplication resolving unit. Accordingly, confusion in communication caused by duplication can be prevented.

Preferably, when the multiple-line adaptation unit is enabled, any one of the plurality of terminals is designated as master and other terminal is designated as slave. The terminal further includes a second slave side handset data transmission unit for transmitting the handset data of at least one handset having an identifier the same as the original identifier allotted to the terminal itself allotted when the terminal is designated as slave, and a second master side handset data transmission unit for transmitting the handset data received from the second slave side handset data transmission unit of other terminal to at least one handset having an identifier the same as the identifier allotted to the terminal itself allotted when the terminal is designated as master. The handset includes a second instrument data update unit for updating the instrument data in the storage unit so as to include the handset data received from the second master side handset data transmission unit.

Therefore, when the multiple-line adaptation unit is enabled, the handset data of each handset of the slave terminal is distributed to each handset of the master terminal by means of the second slave side handset data transmission unit and the second master side handset data transmission unit. In each handset, the second instrument data update unit carries out updating such that the instrument data in the storage unit includes the handset data of each handset of the slave terminal.

Accordingly, when the multiple-line adaptation unit is enabled, each handset of the master terminal refers to the updated instrument data in the storage unit, so that handset data of all handsets of the master terminal and the slave terminal can be checked.

Preferably, a type and the number of the additional function unit are different for each of the plurality of terminals. Therefore, when the telephone system in which the plurality of terminals incorporate the additional function unit of the same type is constructed, all requests for use can be processed in parallel in the additional function unit in each terminal without delay, even if the requests for use of the additional function unit of the same type arrive at the plurality of lines at the same time.

In addition, each terminal has the additional function unit of a different type, so that the type of the additional function unit for which use is requested is not restricted, or a case in which a rejection response is given to the request for use due to absence of the additional function unit of the requested type can be prevented.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Each embodiment of the present invention will be described in detail hereinafter with reference to the drawings.

One digital cordless telephone set according to each embodiment (hereinafter, simply referred to as a "telephone set") includes one base phone and at least one handset communicating with the base phone through INTERCOM. The base phone attains a dual-line adaptation function to allow communication with an external device through two physically different lines and a single-line adaptation function to allow communication with an external device through one line. When the telephone set is connected to another telephone set through the dual-line setting mode so as to allow communication therebetween, the telephone set communicates using the dual-line adaptation function. When the dual-line setting mode is cancelled, a communication connected state with another telephone set is cancelled, whereby switching to communication using the single-line adaptation function is made.

Figure 1:
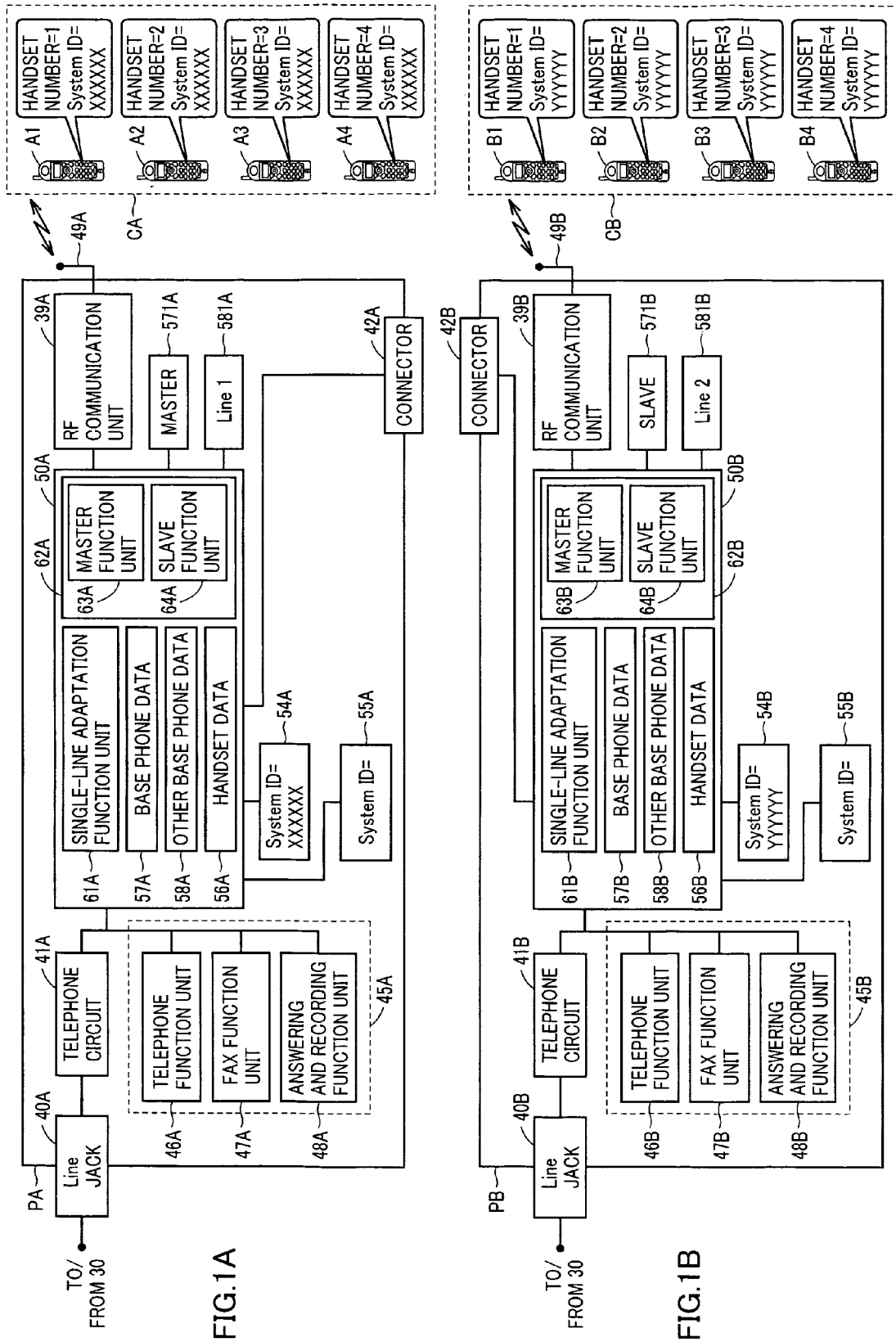
FIGS. 1A and 1B show a configuration of a digital cordless telephone set according to an embodiment.

FIGS. 1A and 1B show the telephone sets in a state where the dual-line setting mode has been cancelled respectively. The telephone set in FIG. 1A has a base phone PA and a handset group CA constituted of at least one handset communicating with base phone PA. The telephone set in FIG. 1B has a base phone PB and a handset group CB constituted of at least one handset communicating with base phone PB.

Handset group CA includes four handsets A1 to A4, and handset group CB includes four handsets B1 to B4. The number of handsets included in each handset group is not limited to four.

Base phone PA includes a line jack 40A for connecting base phone PA to a line 30 to external PSTN (Public Switched Telephone Network) for communicating with the external device, a telephone circuit 41A, a connector 42A, an additional function unit 45A attaining a variety of functions provided to base phone PA, an RF communication unit 39A, an antenna 49A, an RF module 50A, a system information storage area 54A, a system information save area 55A, and storage areas 571A and 581A. Storage area 571A stores master/slave discrimination data indicating whether base phone PA is set to master or slave. Storage area 581A stores information for identifying connected line 30 in response to a dual-line dedicated operation which will be described later.

Line jack 40A connected to line 30 is connected to telephone circuit 41A. Telephone circuit 41A is responsible for basic telephone functions such as connection/release of a communication line set for line 30, dialing, making ringing sounds in response to a calling request, and the like. Telephone circuit 41A is connected to RF module 50A. RF module 50A attains a function to establish wireless communication to each handset in handset group CA through RF communication unit 39A and antenna 49A.

RF module 50A in base phone PA and handsets A1 to A4 in handset group CA connected thereto have a common system ID. The system ID represents an identifier used for authentication in communication. More specifically, the system ID is verified during communication. As a result of verification, communication between the handset and the base phone, between the handsets, or between the base phones, having the common system ID is permitted.

Base phone PA stores the system ID in system information storage area 54A, and saves the system ID in system information save area 55A as required. In addition, base phone PA stores handset data 56A of a handset number for uniquely specifying each handset connected to base phone PA, base phone data 57A serving as an identifier for uniquely specifying the base phone itself, other base phone data 58A representing base phone data of other base phone, a single-line adaptation function unit 61A, and a dual-line adaptation function unit 62A in an internal memory. Here, though single-line adaptation function unit 61A and dual-line adaptation function unit 62A are prepared as executable program data, they may be prepared as dedicated circuits. Dual-line adaptation function unit 62A includes a Master function unit 63A for operation as Master which will be described later and a Slave function unit 64A for operation as Slave which will be described later. One of single-line adaptation function unit 61A and dual-line adaptation function unit 62A is selectively enabled in accordance with an operation mode designated by an external operation.

When the dual-line mode is set, the internal memory stores other base phone data 58A representing base phone data 57B of other base phone connected such that communication is allowed. A memory device for the internal memory, system information storage area 54A, system information save area 55A, and storage areas 571A and 581A is of a type rewritable and of such a type that stored data is not erased even at power failure.

Though additional function unit 45A includes a telephone function unit 46A having a speaker phone or a receiver, a FAX function unit 47A, and an answering and recording function unit 48A, the type or the number of incorporated additional functions are not limited thereto. FAX function unit 47A attains a function to print out facsimile data received through line 30 and to send the facsimile data to line 30 via telephone circuit 41A. Answering and recording function unit 48A has a not-shown recording medium, and attains a function to write in and accumulate voice information or data received from line 30 when a called party is absent. Answering and recording function unit 48A attains a function to read out, reproduce and output the voice information or data stored therein, in response to a prescribed operation. Telephone function unit 46A attains a function for communication with the external device or communication with the handset or communication with other base phone through line 30.

Base phone PB shown in FIG. 1B includes a line jack 40B for connecting to line 30, a telephone circuit 41B, a connector 42B, an additional function unit 45B, an RF communication unit 39B, an antenna 49B, an RF module 50B, a system information storage area 54B, a system information save area 55B, and storage areas 571B and 581B. Additional function unit 45B includes a telephone function unit 46B, a FAX function unit 47B, and an answering and recording function unit 48B. An internal memory of RF module 50B stores handset data 56B, base phone data 57B, other base phone data 58B, a single-line adaptation function unit 61B, and a dual-line adaptation function unit 62B. Dual-line adaptation function unit 62B includes a Master function unit 63B for operation as Master which will be described later and a Slave function unit 64B for operation as Slave which will be described later.

As the function of each unit shown with 'xxB' in base phone PB has a function similar to that of the corresponding unit shown with 'xxA' in base phone PA, description thereof will not be repeated.

It is noted that the system ID (=xxxxxx) allotted in common to base phone PA and each handset in handset group CA in one telephone set is different from the system ID (=YYYYYY) allotted in common to base phone PB and each handset in handset group CB in the other telephone set. The system ID for each base phone is written in system information storage area 54A (or 54B) at the time of shipment of the base phone from a factory. Meanwhile, as to base phone data 57A (or 57B), a common fixed value such as "1" (or "0") is stored in different base phones at the time of shipment from the factory.

In each telephone set shown in FIGS. 1A and 1B, the single-line adaptation function is active and the system ID allotted to the telephone set is different from each other. Therefore, base phone PA and its handset group CA cannot call, or cannot be called by, base phone PB and its handset group CB. Similarly, base phone PB and its handset group CB cannot call, or cannot be called by, base phone PA and its handset group CA.

Figure 2:
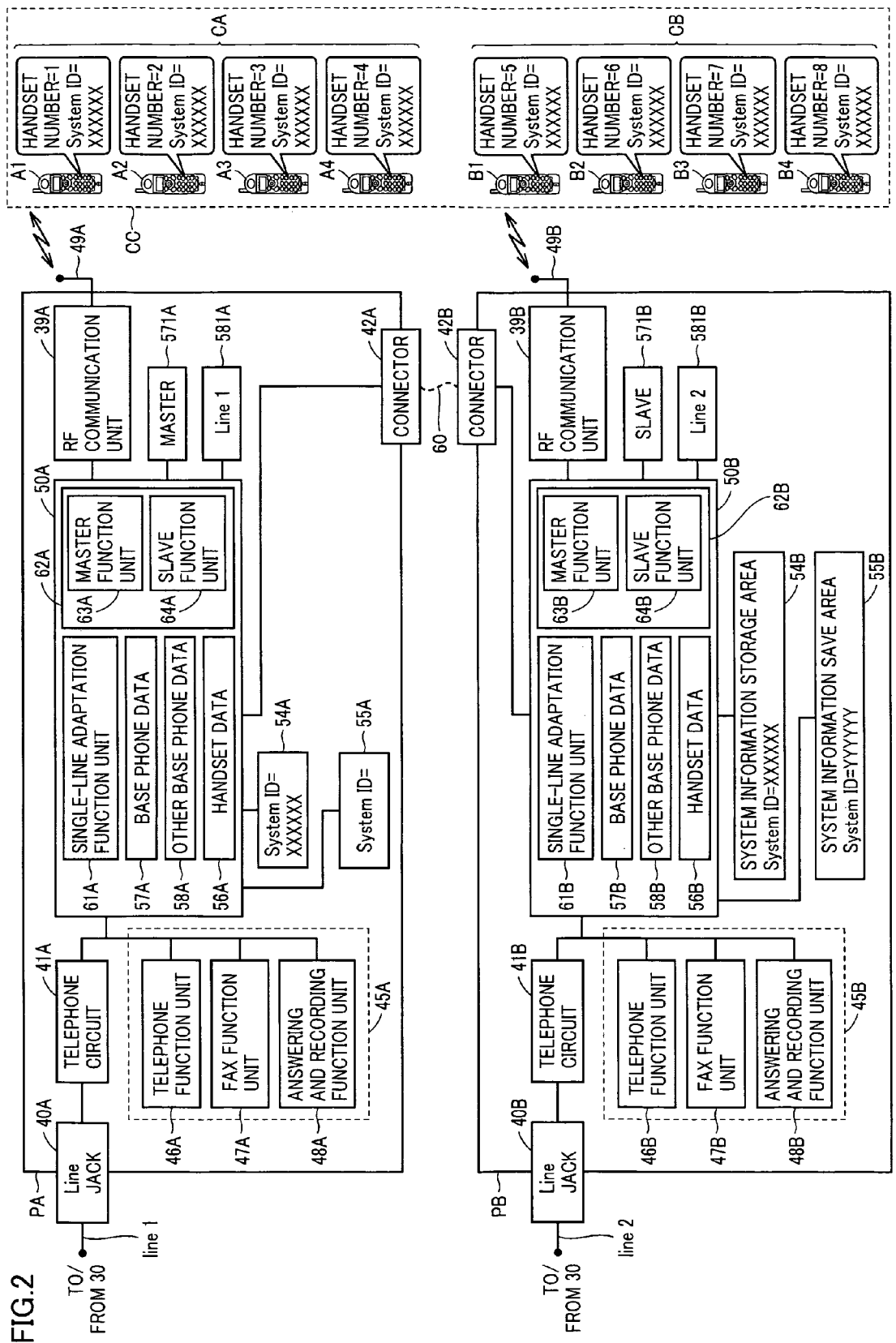
FIG. 2 illustrates a state in which two base phones in FIGS. 1A and 1B are connected to each other.

FIG. 2 shows a system configuration in the dual-line setting mode. In FIG. 2, base phone PA in FIG. 1A is connected to base phone PB in FIG. 1B via connectors 42A and 42B by cable 60 for dedicated communication, so as to allow communication therebetween. Here, though the communication path between the base phones is implemented by cable 60, connection may be established by wireless communication. Cable 60 may be of any type so long as bidirectional transmission/reception of a command is allowed, in compliance with RS232C or PCM bus. In addition, the communication path is activated when the dual-line adaptation function is enabled through the dual-line setting mode (cable 60 is connected so as to allow communication between connectors 42A and 42B). On the other hand, when the single-line adaptation function is enabled to attain the state shown in FIGS. 1A and 1B, the communication path is inactivated (cable 60 is disconnected from connectors 42A and 42B and communication is disallowed).

In the dual-line setting mode, base phones PA and PB as well as each handset in handset groups CA and CB have the same system ID. Handset group CA and handset group CB constitute a handset group CC having a common system ID. In the state shown in FIG. 2, base phones PA and PB have the dual-line adaptation function set to valid. Base phones PA and PB having the dual-line adaptation function set are connected to line 30 respectively. In FIG. 2, for the sake of simplification of description, line 30 connected to base phone PA is referred to as Line 1, while line 30 connected to base phone PB is referred to as Line 2.

In FIG. 2, a terminal PP including base phones PA and PB having the dual-line adaptation function set to valid is provided. Single terminal PP is functionally adapted to two lines. In other words, in order to simultaneously achieve communication through Line 1 and Line 2, terminal PP includes two telephone circuits 41A and 41B connected to Line 1 and Line 2 respectively and two RF modules 50A and 50B. In the present embodiment, out of the two RF modules, one which is connected to Line 1 has initiative on communication. Therefore, one RF module connected to Line 1 is referred to as Master, while the other RF module connected to Line 2 and operating in a manner subordinate to Master in terms of communication is referred to as Slave. As Master and Slave have the common system ID, Master and Slave can both call each handset in handset group CC. Moreover, both of Master and Slave can detect a command transmitted from handset group CC.

In this manner, even when Master is being used for a call with the outside through Line 1, Slave can respond to a line connection request from any handset in handset group CC, using Line 2. That is, each handset can automatically use an idle line. In addition, each handset can select a line and make a call.

When a call is made with Line 1 being designated, Master responds to the line connection request. Meanwhile, when a call is made with Line 2 being designated, Slave responds to the line connection request. With regard to an incoming call as well, calling through either line can be responded. If calls simultaneously arrive at both lines, response to any desired call can be made through a selection operation.

An LCD (Liquid Crystal Display) displays a line connected to Master as Line 1 and a line connected to Slave as Line 2, and displays through which line a call is being made when the call arrives. In addition, different ringing frequencies or melodies can be set for Line 1 and Line 2, so that the user can discriminate through which line the call is being made.

In the configuration in FIG. 2, terminal PP includes two additional function units, that is, additional function units 45A and 45B. Accordingly, increase in the cost is unavoidable. In order to avoid cost increase, terminal PP may be provided with a single additional function unit. In such a case, the following limitation is imposed. Specifically, when the FAX function unit is busy because of FAX communication through Line 1, FAX communication of Line 2 cannot start until FAX communication through Line 1 is completed and the FAX function unit is released, even if a FAX call arrives at Line 2. This is also the case with the answering and recording function. Therefore, it is desirable to determine the number of the additional function units to be provided, by comparing the cost with the limitation.

In the dual-line setting mode in FIG. 2, base phone PA of terminal PP is set as Master, while base phone PB is set as Slave. Each handset in handset group CC and base phone PB share the system ID of base phone PA serving as Master.

In the configuration in FIG. 2, base phones PA and PB and each handset in handset group CC can call, or can be called by, each other. Accordingly, an environment equivalent to that achieved by single terminal PP adapted to two lines (Line 1 and Line 2) can be established. In such an environment, INTERCOM communication or call transfer between each handset in original handset group CA and each handset in original handset group CB is allowed.

Using base phone PB as a second base phone, INTERCOM communication or call transfer from original handset group CA is allowed. In addition, using base phone PA as a second base phone, INTERCOM communication or call transfer from each handset in original handset group CB is allowed. Moreover, making a call from each handset in original handset group CA using Line 2 or responding to a call from Line 2 is allowed. Furthermore, making a call from each handset in original handset group CB using Line 1 or responding to a call from Line 1 is allowed.

(Block Configuration of Instrument)

Figure 3:
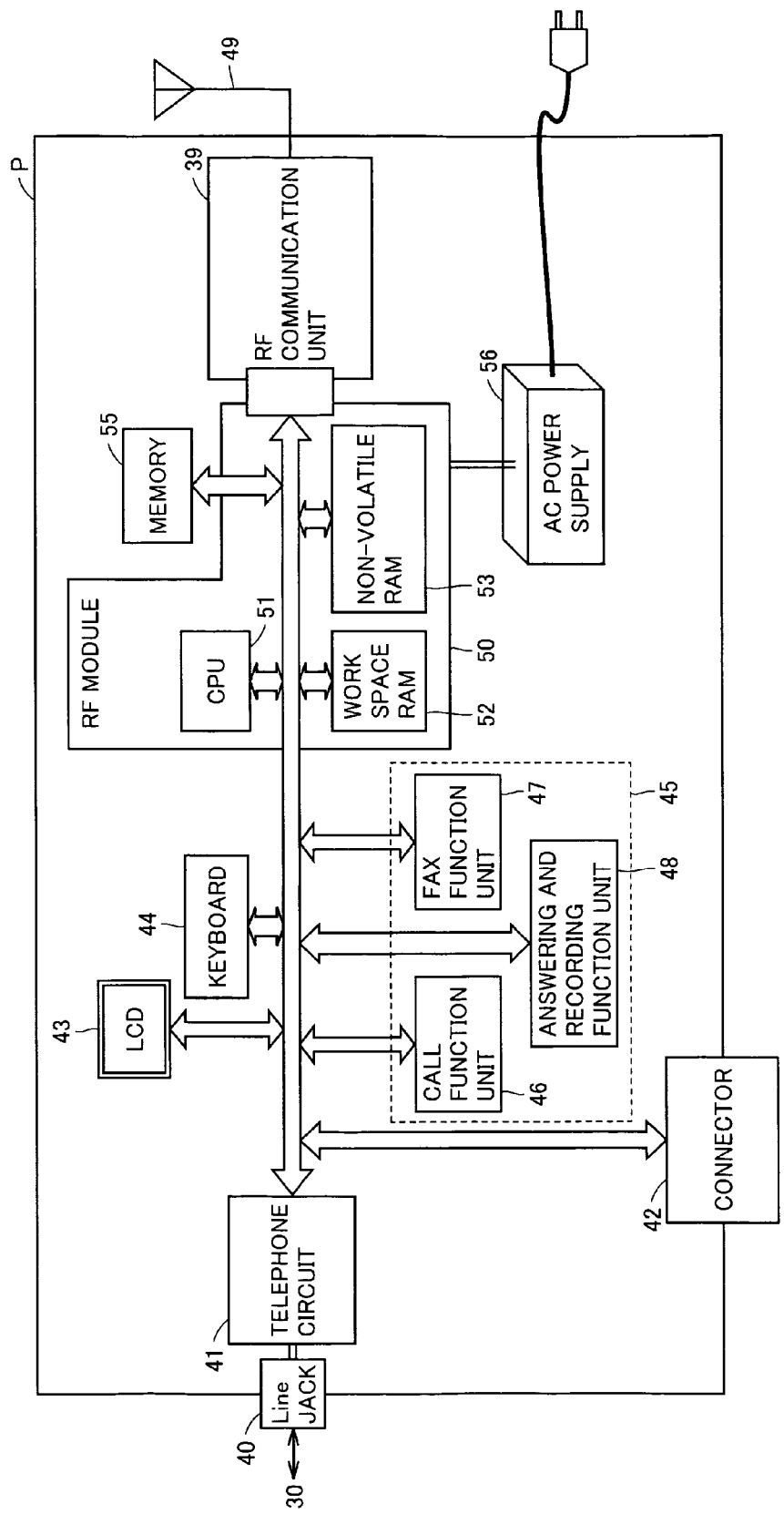
FIG. 3 is a block diagram of the base phone according to the embodiment.
Figure 4:
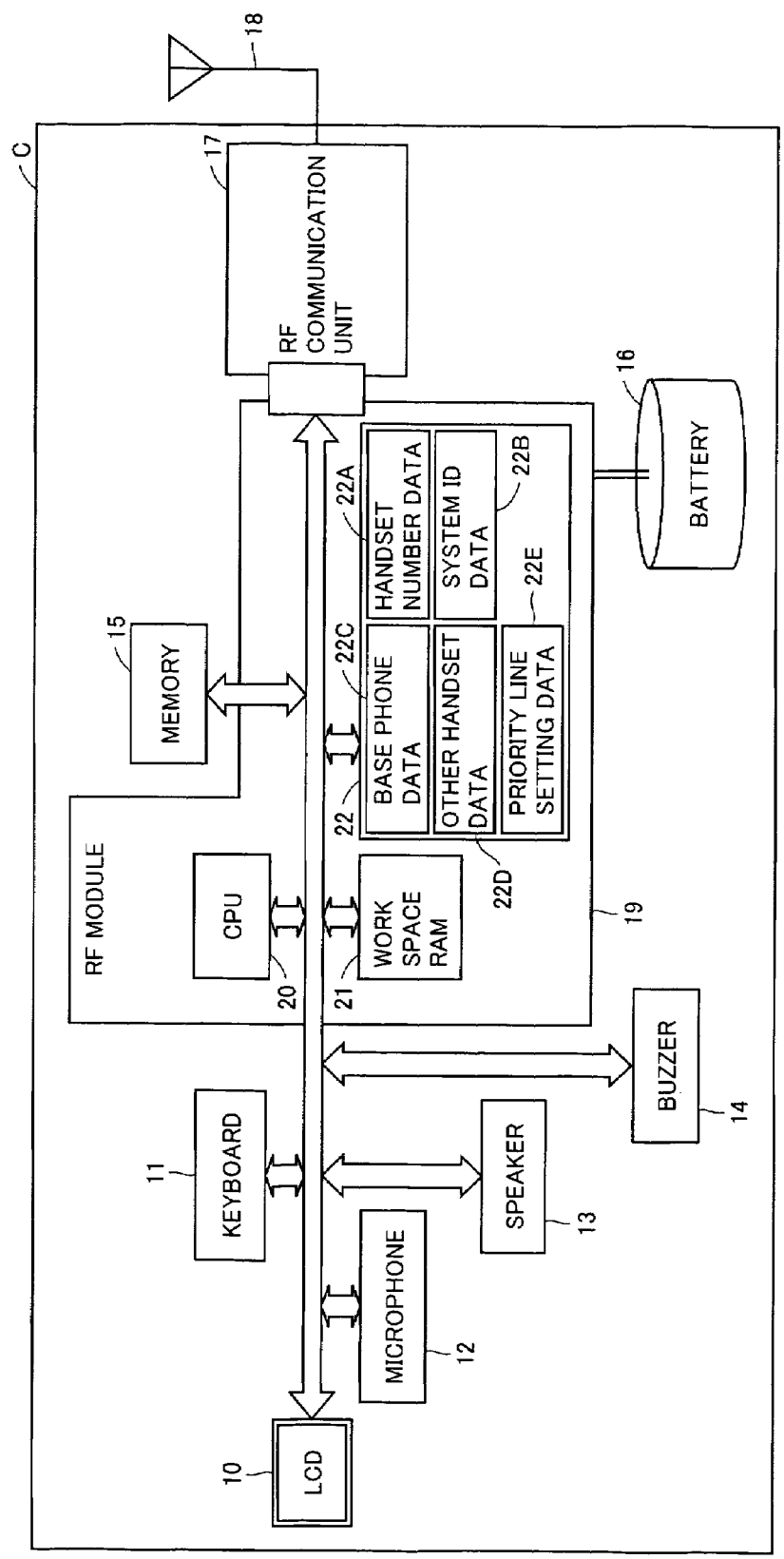
FIG. 4 is a block diagram of a handset according to the embodiment.

FIG. 3 shows a block configuration of a base phone P, while FIG. 4 shows a block configuration of a handset C. Base phones PA and PB shown in FIGS. 1A, 1B and 2 have a block configuration similar to that shown in FIG. 3. Each handset belonging to handset groups CA, CB, and CC also has a block configuration similar to that of handset C shown in FIG. 4.

Referring to FIG. 3, base phone P includes a line jack 40 connecting corresponding line 30 to PSTN, a telephone circuit 41, a connector 42 for dedicated communication cable, an LCD 43, a keyboard 44, an additional function unit 45, a memory 55 implemented by an ROM (Read Only Memory) or an RAM, an AC (Alternating Current) power supply 56, an RF communication unit 39, and an antenna 49. Telephone circuit 41 monitors a signal level at line jack 40. Telephone circuit 41 determines whether line 30 is being used or not, based on whether the signal level indicates busy (a signal being transmitted) or idle (unused) of line 30. Telephone circuit 41 notifies a CPU 51 of a result of determination.

RF module 50 is implemented by a one-chip microcomputer, and has CPU (Central Processing Unit) 51, a work space RAM (Random Access Memory) 52, and a non-volatile RAM 53. Non-volatile RAM 53 includes system information storage area 54A (54B) and system information save area 55A (55B). Non-volatile RAM 53 also stores handset data 56A (56B), base phone data 57A (57B), and other base phone data 58A (58B).

Connector 42 for dedicated communication cable corresponds to connectors 42A and 42B. Line jack 40 corresponds to line jacks 40A and 40B. Telephone circuit 41 corresponds to telephone circuits 41A and 41B. Additional function unit 45 corresponds to additional function units 45A and 45B. Additional function unit 45 corresponds to telephone function unit 46 corresponding to telephone function unit 46A (46B), FAX function unit 47 corresponding to FAX function unit 47A (47B) and answering and recording function unit 48A (48B). RF communication unit 39 corresponds to RF communication unit 39A (39B). Antenna 49 corresponds to antenna 49A (49B).

Keyboard 44 is provided for external operation by the user and input of a prescribed instruction such as mode switching and a variety of information including a telephone number. LCD 43 is provided in order to display a variety of information such as notification of an incoming call.

Referring to FIG. 4, handset C includes an LCD 10, a keyboard 11, a microphone 12, a speaker 13, a buzzer 14, a memory 15, a battery 16, an RF communication unit 17 connected to an antenna 18, and an RF module 19 implemented by a one-chip microcomputer. Handset C has a configuration the same as that in a conventional example.

RF module 19 includes a CPU 20, a work space RAM 21, and a non-volatile RAM 22. Non-volatile RAM 22 stores handset number data 22A serving as data for uniquely specifying (identifying) handset C, a system ID 22B, base phone data 22C representing base phone data 57A or 57B having the system ID the same as that of handset C allotted, other handset data 22D representing handset number data 22A of other handset having the system ID the same as that of handset C allotted, and priority line setting data 22E. Priority line setting data 22E is set by a dual-line dedicated operation which will be described later.

Keyboard 11 is externally operated by the user for input of a variety of information including a telephone number. LCD 10 is provided in order to display a variety of information such as information of an incoming call. Microphone 12 and speaker 13 are provided for a call. Buzzer 14 is provided for notification of a variety of information using sound, for example, ringing sounds for notification of an incoming call.

FIGS. 5A to 5I show configurations of a packet 70 transmitted/received between instruments in the present embodiment. RF communication unit 39 in base phone P modulates packet 70 sent from CPU 51 so as to allow transmission thereof, and transmits the packet through antenna 49. RF communication unit 17 in the handset modulates packet 70 sent from CPU 20 so as to allow transmission thereof, and transmits the packet through antenna 18. In addition, RF communication unit 39 and RF communication unit 17 demodulate packet 70 received via antenna 49 and 18 and output the packet as data that can be processed in CPU 51 and 20, respectively.

Figure 5A:
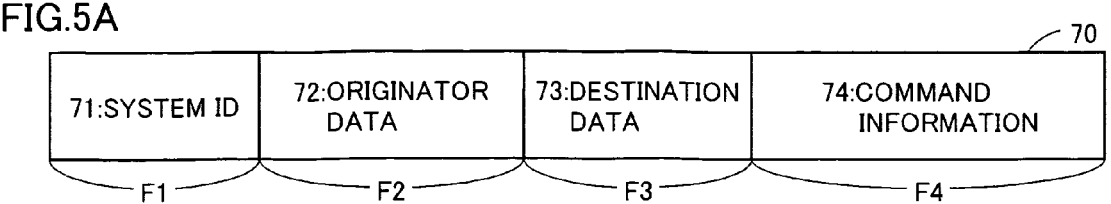
FIGS. 5A to 5I show configurations of a packet for communication according to the embodiment.

As shown in FIG. 5A, packet 70 has a field F1 for storing a system ID 71, a field F2 storing originator data 72 for uniquely specifying an originator instrument of packet 70, a field F3 storing destination data 73 for uniquely specifying a destination instrument of packet 70, and a field F4 for storing command information 74 representing a variety of information such as a command and data for executing the command.

Originator data 72 is represented by handset number data 22A if the originator is the handset, and represented by base phone data 57A (or 57B) of the base phone if the originator is the base phone. In addition, destination data 73 is represented by handset number data 22A if the destination is the handset, and represented by base phone data 57A (or 57B) of the base phone if the destination is the base phone. The originator handset can determine the destination data based on base phone data 22C or handset data 22D. The originator base phone can determine the destination data based on handset data 56A (or 56B).

Data stored in packet 70 of which basic configuration has been shown in FIG. 5A is different depending on a manner of communication.

Figure 5B:
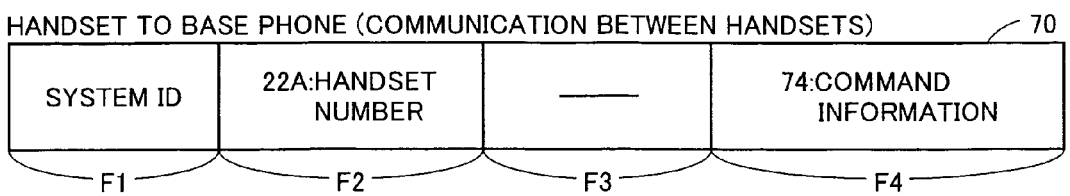

As shown in FIG. 5B, packet 70 transmitted from the handset to the base phone during communication between the handsets (INTERCOM communication) stores system ID data 22B, handset number data 22A of the originator handset, and command information 74 including destination handset number data 22A instructing INTERCOM communication in field F1, field F2 and field F4 respectively. The contents in field F4 of packet 70 in FIG. 5B is based on data input through the operation of keyboard 11 by the user.

Figure 5C:
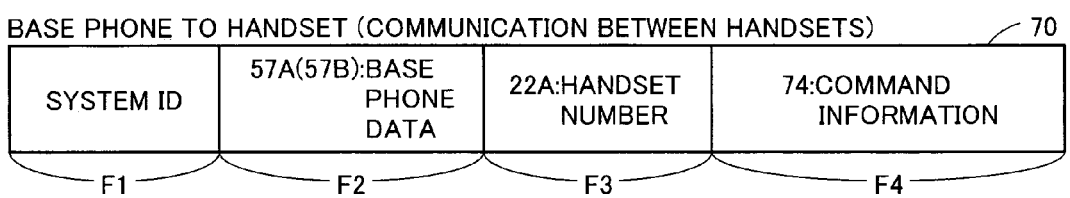

Packet 70 in FIG. 5C represents packet 70 received by the base phone in communication between the handsets in FIG. 5B and transmitted to the handset in response. Packet 70 stores the system ID data in field F1, and stores information based on the contents in packet 70 in FIG. 5B in fields F2, F3, and F4.

Figure 5D:
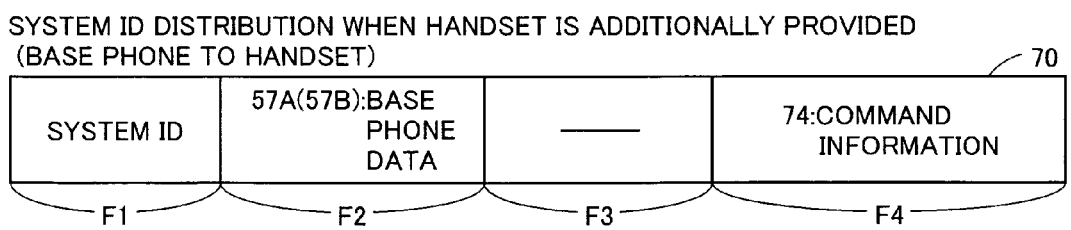
Figure 5E:
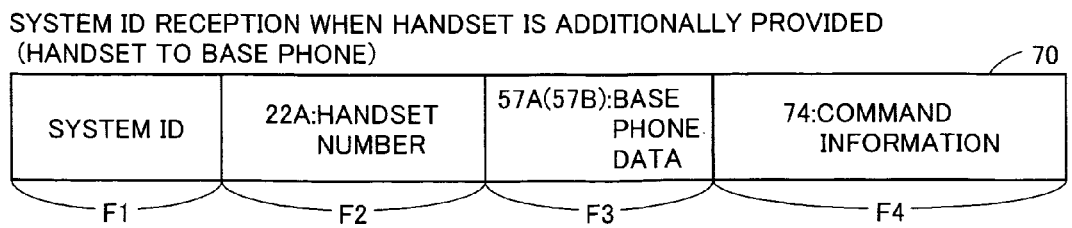

When a handset communicating with the base phone is additionally provided, packet 70 in FIGS. 5D and 5E is transmitted and received. The base phone transmits packet 70 in FIG. 5D to the handset to be additionally provided. Packet 70 stores the system ID data in field F1, and stores command information 74 for instructing setting for distribution of the system ID data or the like to the additionally provided handset in field F4. When the handset to be additionally provided receives packet 70 in FIG. 5D, the additionally provided handset transmits packet 70 in FIG. 5E to the base phone. Packet 70 in FIG. 5E stores the system ID data set in the additionally provided handset in field F1, and stores command information 74 indicating reception of the distributed system ID data in field F4.

Figure 5F:
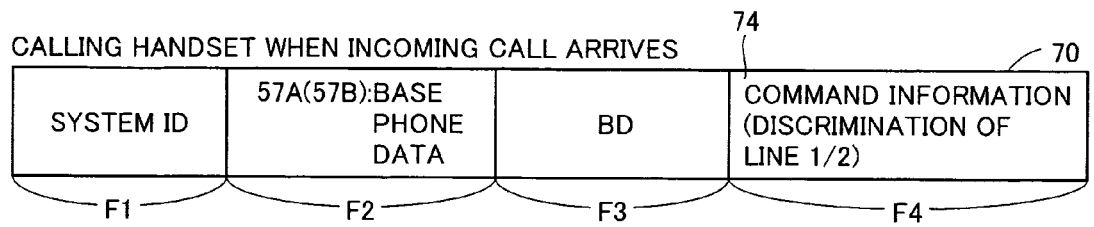

When a call from the outside arrives through line 30, the base phone transmits packet 70 in FIG. 5F for calling the handset. Packet 70 stores the system ID data of the base phone that has detected the incoming call in field F1, stores data BD indicating that the packet is destined to all handsets (broadcast) in field F3, and stores command information 74 instructing that the call from the outside has arrived in field F4. Command information 74 stores data instructing a type of the outside line at which the call from the outside has arrived (discrimination of Line 1 and Line 2 as to line 30 in the dual-line setting mode which will be described later).

Figure 5G:
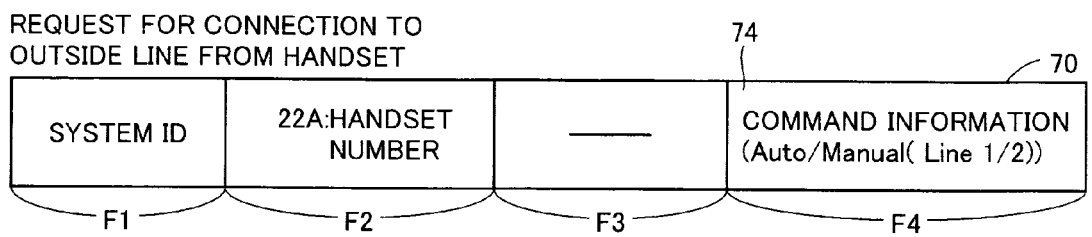

When connection to the outside line is requested from the handset, packet 70 in FIG. 5G is transmitted from the handset to the base phone. Packet 70 stores system ID data 22B of the originator handset in field F1 and stores command information 74 in field F4. Command information 74 includes data indicating discrimination between AUTO and manual which will be described later or discrimination between Line 1 and Line 2 for designating an outside line to be connected.

Figure 5H:
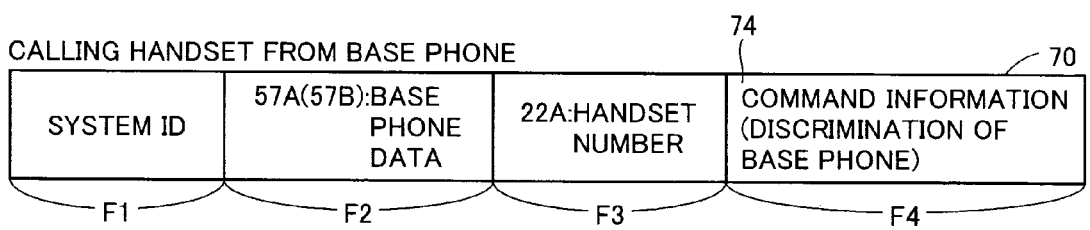

When the base phone calls the handset, the base phone generates packet 70 in FIG. 5H and transmits the packet to the handset. Packet 70 stores the system ID data of the originator base phone in field F1, stores number data 22A of a called handset in field F3, and stores command information 74 for calling the handset in field F4.

Figure 5I:
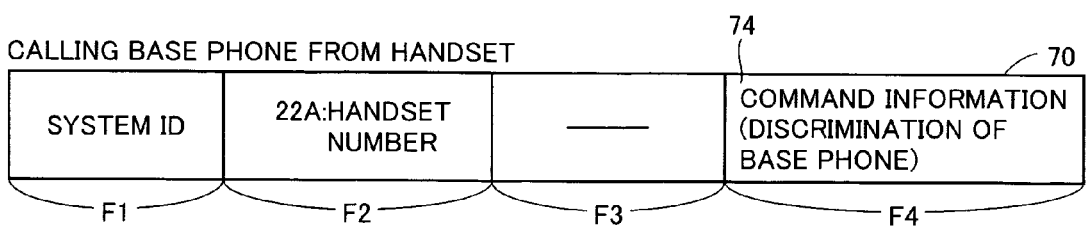

When the handset calls the base phone, the handset generates and transmits packet 70 in FIG. 5I. Packet 70 stores system ID data 22B of the originator handset in field F1 and stores command information 74 for calling the base phone in field F4.

When packet 70 in FIGS. 5H and 5I is transmitted in the dual-line setting mode which will be described later, command information 74 includes base phone discrimination data for specifying a caller or a called base phone (data indicating discrimination between master and slave).

It is noted that a sign "-" in field F3 in FIGS. 5A to 5I indicates that the data is undefined. The handset or the base phone that has received the undefined data ignores the contents in that field.

A process for operating the telephone set that has operated using the single-line adaptation function as in FIGS. 1A and 1B, using the dual-line adaptation function as in FIG. 2 will now be described.

Figure 6:
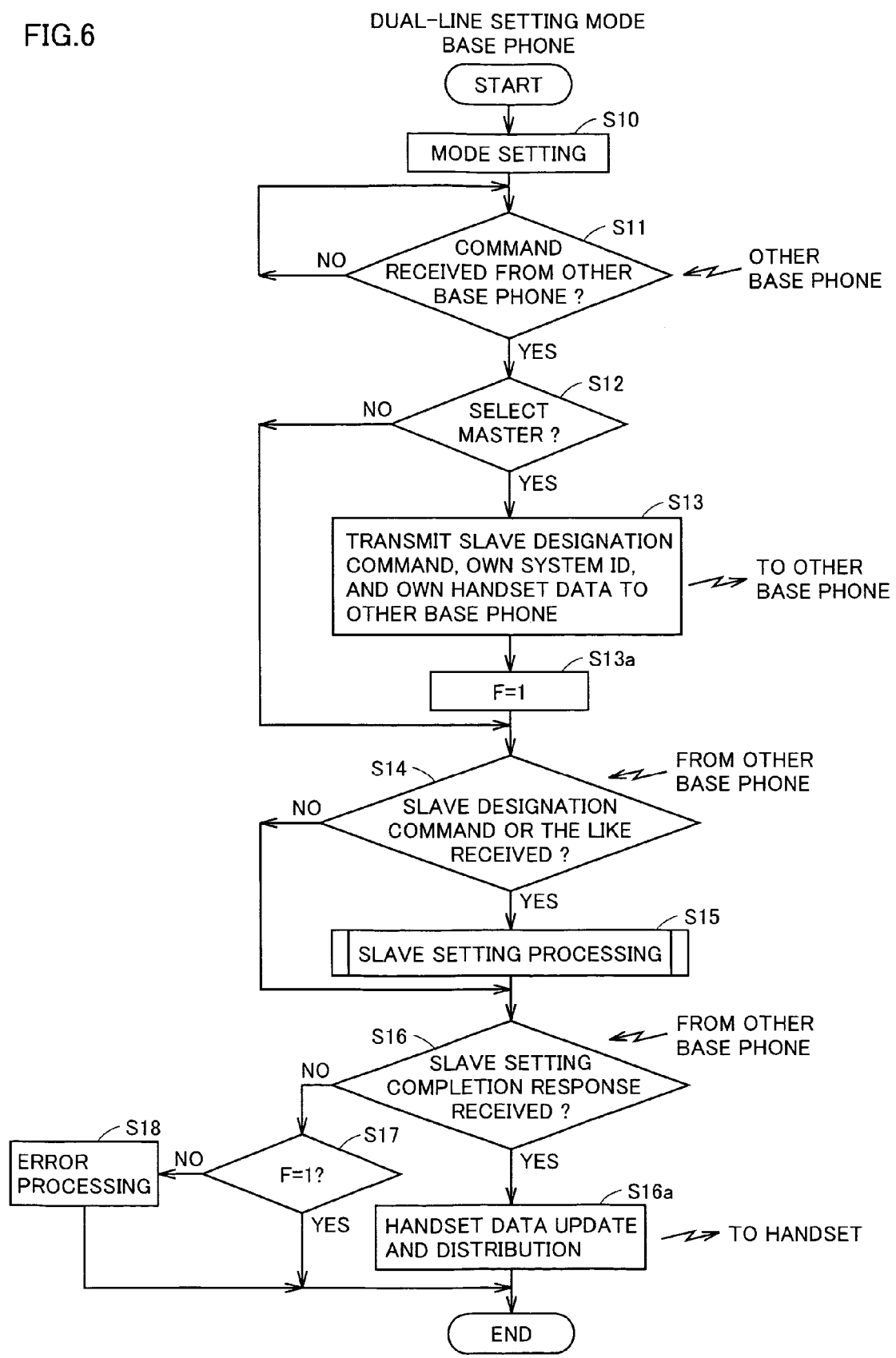
FIG. 6 is a flowchart of processing when a dual-line setting mode is set according to the embodiment.

FIG. 6 shows a flowchart of processing when the dual-line setting mode according to the present embodiment is set. Initially, base phones PA and PB in FIGS. 1A and 1B are connected by cable 60 via connectors 42A and 42B (see FIG. 2). Thereafter, each of base phones PA and PB is instructed to make a transition to the dual-line setting mode, by the operation by the user through keyboard 44. Then, the following processing is performed in each base phone. It is noted that, in communication between the base phones, the originator base phone is specified by base phone data 57A (57B) and the destination base phone is specified by other base phone data 58A (58B).

When CPU 51 receives the instruction to make a transition to the dual-line setting mode, a transition to the dual-line setting mode is made (step S (hereinafter, simply abbreviated as S) 10). Then, CPU 51 waits until a command is received from the other base phone through cable 60 (step S11).

Here, the base phone desired to function as Master is subjected to the selection operation for being set as Master, through the operation of keyboard 44 by the user. Here, it is assumed that base phone PA is selected as Master by the user operation.

Base phone PA will now be described. When CPU 51 in base phone PA receives the command from other base phone (YES at S11), whether or not the base phone itself is selected as Master is determined based on the contents in storage area 571A (S12). Base phone PA that has been selected as Master transmits the system ID of the base phone itself and its handset data 56A to other base phone PB through cable 60, along with a Slave designation command to other base phone PB (S13). Thereafter, base phone PA sets a control flag F to 1 (S13a). Then, base phone PA determines whether or not it should receive the Slave designation command from base phone PB through cable 60 (S14). As base phone PA is designated as Master, base phone PA does not receive the Slave designation command. Therefore, base phone PA determines whether or not base phone PA should receive a response indicating that slave setting has normally been completed from base phone PB (S16).

When base phone PA receives a Slave setting completion response from base phone PB (YES at S16), base phone PA updates its handset data 56A using handset data 56B received along with the response. In addition, base phone PA distributes handset data 56A to each handset A1 to A4 subordinate to base phone PA itself. Therefore, in each handset, other handset data 22D is updated with distributed handset data 56A (S16a). As a result, handset data 56A of base phone PA indicates handset number data 22A different from that of each handset in handset group CC, and other handset data 22D of each handset A1 to A4 indicates handset number data 22A of other handset in handset group CC except for the handset. Thereafter, assuming that the dual-line setting has normally been completed, a series of processing is ended.

When the Slave setting completion response cannot be received after waiting for a prescribed time period (NO at S116), whether or not control flag F is set to 1 is determined (S17). Here, control flag F represents a temporary variable for processing the dual-line setting mode. Specifically, whether or not the slave designation command has been transmitted to other base phone is indicated by 1 or 0 in the Master base phone, and whether or not the slave setting processing has been completed and the slave setting completion response has been transmitted to other base phone is indicated by 1 or 0 in the Slave base phone.

If control flag F is not set to 1 (NO at step S17), an error processing is performed (S18), and a series of processing is ended. If control flag F is set to 1 (YES at step S17), base phone PA serving as Master was able to receive the slave setting completion response to the previously transmitted Slave designation command, and the series of processing is ended. In this manner, Master function unit 63A is activated instead of single-line adaptation function unit 61A in base phone PA, and an operation in accordance with Master function unit 63A is now ready to start.

On the other hand, the following processing is performed in base phone PB. Initially, mode setting is made in a manner similar to that in base phone PA (S10), and base phone PB receives a command from other base phone PA (YES at S11). As base phone PB determines that it is not selected as Master based on the contents in storage area 571B (NO at S12), the processing at S13 and S13a is skipped. Then, whether or not base phone PB receives the Slave designation command or the like through cable 60 from base phone PA is determined (S14). When base phone PB receives a result of determination, the Slave designation command or the like (YES at S14), the Slave setting processing in FIG. 7 which will be described later is performed (S15). If reception is not successful after waiting for a prescribed time period (NO at S14), a series of processing is ended or a prescribed error processing is performed.

After execution of the Slave setting processing, CPU 51 in base phone PB determines whether or not the Slave setting completion response is received (S16). As base phone PB does not receive the Slave setting completion response, whether or not control flag F is set to 1 is determined (S17). If control flag F is not set to 1 (NO at S17), a prescribed error processing is performed (S18) and the processing is ended.

If control flag F is set to 1 (YES at S17), it is assumed that the processing for the dual-line setting mode has normally been carried out in base phone PB, and the series of processing is ended. In this manner, Slave function unit 64B is activated instead of single-line adaptation function unit 61B in base phone PB, and an operation in accordance with Slave function unit 64B is now ready to start.

Figure 7:
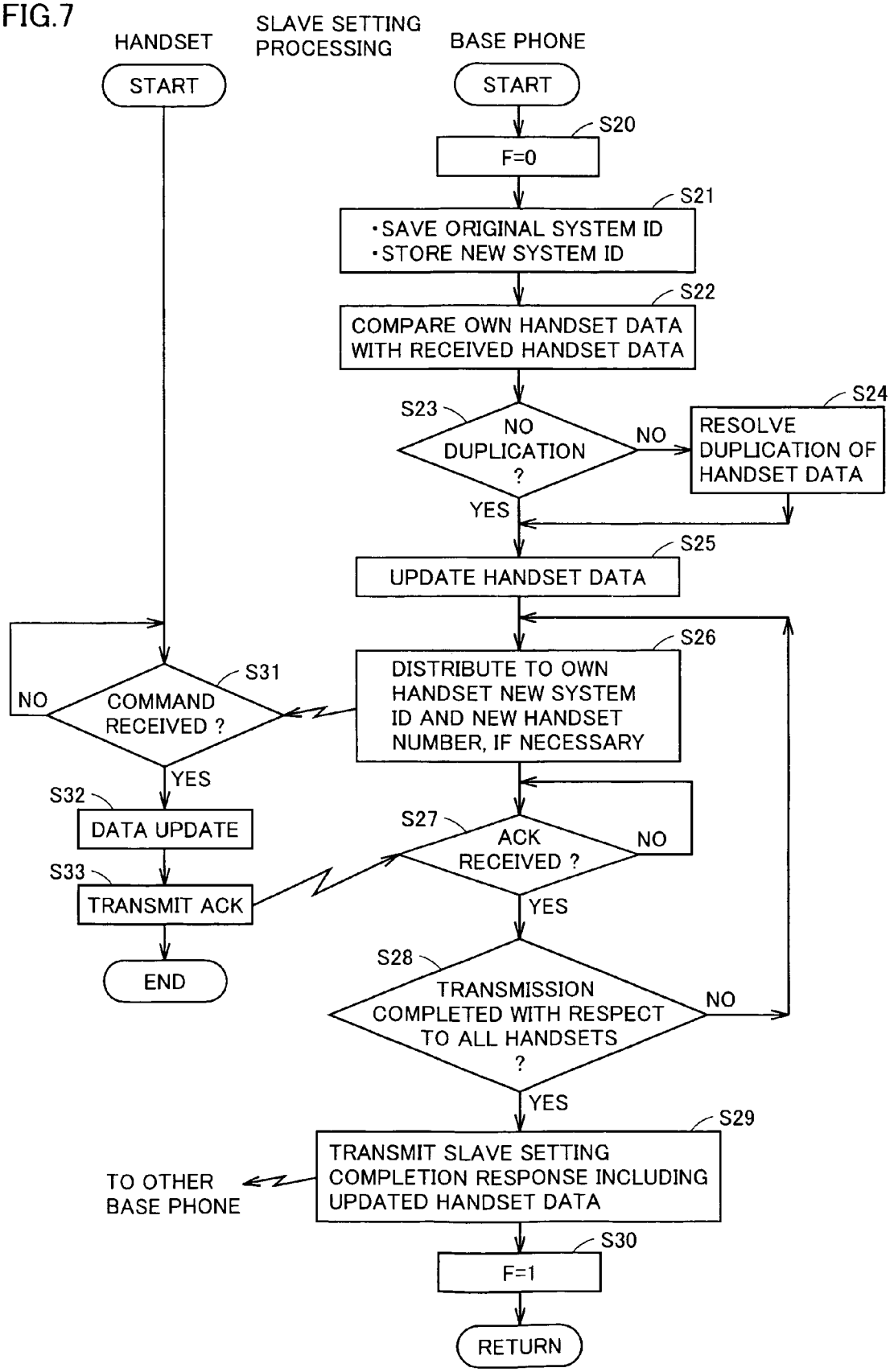
FIG. 7 is a flowchart of Slave setting processing according to the embodiment.

Here, a procedure for the Slave setting processing (S15) in FIG. 6 will be described with reference to FIG. 7.

In the Slave setting processing in base phone PB, initially, CPU 51 sets control flag F to 0 (S20). Then, as base phone PB knows that the base phone itself is allotted as Slave based on the contents in storage area 571B, base phone PB confirms that a new system ID should be used from now on. The original system ID should be used again when the dual-line mode is cancelled. Therefore, CPU 51 in base phone PB stores (saves) the system ID read from system ID storage area 54B in system ID save area 55A. Then, CPU 51 stores the system ID received from base phone PA in system ID storage area 54A (S21).

Thereafter, handset data 56B of base phone PB is compared with handset data 56A received from base phone PA (S22). Here, duplication between handset number data 22A of each handset subordinate to base phone PB and handset number data 22A of each handset subordinate to base phone PB is checked. If duplication is observed (NO at S23), handset number data 22A of the handset having the duplicated data is modified such that handset number data 22A represents a vacant number. Thus, duplication is resolved (S24) and the process proceeds to S25.

On the other hand, if duplication is not observed (YES at S23), handset data 56B of base phone PB is updated with received handset data 56A (S25). According to this update, handset data 56B of base phone PB includes handset number data 22A of each handset in handset group CB and handset data 22A of each handset in handset group CA. In addition, if duplication is resolved at S24, updating so as to instruct each handset data 22A and each handset data 22B obtained as a result of elimination of duplication is made.

Thereafter, base phone PB distributes to each handset B1 to B4 subordinate to base phone PB, packet 70 storing updated handset data 56B, the new system ID read from system ID storage area 54B, and a command instructing update of corresponding data using these as command information 74. In addition, packet 70, in which a command to instruct setting as command information 74 of a new handset number (handset number data 22A) allotted as a result of elimination of duplication is set, is distributed to the handset having duplicated handset number data 22A (S26). Here, the original system ID stored in system information save area 55B is used as the system ID in field F1 of packet 70.

On the other hand, upon receiving packet 70 distributed from base phone PB at S26 (YES at S31), each handset that has been subordinate to base phone PB processes received packet 70 if destination data 73 of received packet 70 matches with handset number data 22A of the handset itself. If destination data 73 does not match with handset number data 22A, each handset discards received packet 70. The handset to process received packet 70 uses the system ID in field F4 of received packet 70 and handset data 56B so as to rewrite its system ID data 22B and other handset data 22D (S32). Moreover, as the handset that has had duplicated handset number receives packet 70 storing the command instructing setting of a new handset number (handset number data 22A), the handset uses command information 74 in received packet 70 so as to update its handset number data 22A (S32).

When data update is finished, CPU 20 transmits packet 70 storing ACK (Acknowledge) in field F4 in order to notify base phone PB of completion of data update through RF communication unit 17. Original system ID 22B is also used for system ID 71 of packet 70 storing ACK (S33).

Upon receiving packet 70 storing ACK from each handset (YES at S27), CPU 51 in base phone PB determines whether or not transmission has been completed with respect to all handsets (S28). If transmission has not been completed, the process returns to S26. That is, packet 70 is distributed to next handset and the processing thereafter is repeated. If it is determined that transmission is completed with respect to all handsets as a result of reception of ACK (YES at S28), the Slave setting completion response including updated handset data 56B is transmitted to base phone PA (S29). Thereafter, in order to indicate that the Slave setting processing has normally ended, control flag F is updated to 1 (S30). Then, the process returns to the original processing (FIG. 6).

Though base phone PA has been designated as Master here, base phones PA and PB may be set to either Master or Slave respectively.

In addition, though the system ID allotted to Master has been shared here, the system ID may be newly generated in base phone PA serving as Master and this new system ID may be shared.

(Line Control Procedure in Dual-Line Setting Mode)

Communication control in the dual-line setting mode in FIG. 2 will now be described.

A cordless digital telephone system adapted to the dual-line system constructed through the dual-line setting mode can employ two base phones PA and PB as the base phone and employ two lines Line 1 and Line 2.

As described above, base phone PA is set as Master, a line connected thereto is set as Line 1, base phone PB is set as Slave, and a line connected thereto is set as Line 2. The operation is performed through keyboard 44 of each base phone by the user. Data input through the operation is stored in storage areas 581A and 581B respectively. In each handset in handset group CC, in calling a base phone after transition to the dual-line setting mode is made, an operation to designate which of base phones PA and PB is called is required.

As to the line to be connected, the user operates keyboard 11 to designate a method of selecting which of usable Line 1 and Line 2 is employed. Provided selection methods include a method of designating a desired Line (hereinafter, referred to as MANUAL) and a method of automatically selecting an idle line (hereinafter, referred to as AUTO).

In an example where AUTO is designated, when both lines are idle or both lines are busy, line selection follows "priority line setting data." The "priority line setting data" refers to data indicating which of Line 1 and Line 2 is to be used. Such data is stored in non-volatile RAM 22 as priority line setting data 22E through input in advance by the user through the operation of keyboard 11 of the handset.

Such an operation is referred to as a "dual-line dedicated operation." The dual-line dedicated operation is not necessary and prohibited in the environment of the single-line system as shown in FIGS. 1A and 1B. The dual-line dedicated operation is performed by the user through keyboard 11. The contents set through the dual-line dedicated operation is stored in non-volatile RAM 22.

In order to activate the dual-line dedicated operation described above, base phone PA serving as Master and base phone PB serving as Slave distribute packet 70 storing information "dual-line system=Enable" in field F4 to each handset that has been subordinate to the base phones themselves. When each handset receives packet 70, each handset is set to a state in which a communication operation based on the contents set through the dual-line dedicated operation is executable, in accordance with the information in field F4 of received packet 70.

Thereafter, calling, INTERCOM, or call transfer between the handsets that have been subordinate to different base phone is enabled. In addition, two base phones can be selected and called, so as to selectively use two lines. Moreover, the handsets can be called by both base phones, and the ringing sound using buzzer 14 is made in response to calling through either line. In each handset, when called, from which of Line 1 and Line 2 the call is made is specified based on the received packet. For example, a tone of the ringing sound of buzzer 14 is varied, different melodies are used for discrimination, a Line name through which the call is made is shown on LCD 10, a not-shown LED lamp indicates discrimination between Line 1 and Line 2, or Line 1 and Line 2 are discriminated by blinking of a backlight of LCD 10.

Master and Slave operate in accordance with a rule for avoiding interference which will be described later, so that a system similar to the dual-line-adapted terminal that has conventionally been provided can be constructed, even if terminal PP having two RF communication units 39 in one housing is provided.

In the dual-line-adapted terminal that has conventionally been provided, a configuration in which one resource is allotted to each of the answering and recording function and the FAX function is commonly employed. Therefore, if requests using the same resource are received at the same time through two lines (Line 1 and Line 2), one request can be responded but the other request should wait until the processing of one request is completed. In terminal PP in FIG. 2, two base phones can be provided with these resources in additional function units 45 respectively. Therefore, both requests can simultaneously be processed in parallel, without delay.

If a manufacturer offers a plurality of types of base phones in compliance with the specifications, the user can construct terminal PP including the dual-line system as he/she desires in various combinations. For example, the user can construct terminal PP including base phone PA attaining the FAX function with the cordless handset and base phone PB attaining the answering and recording function with the cordless handset, or terminal PP having base phone PA attaining a thermal transfer FAX function with the cordless handset and base phone PB attaining a laser FAX function with the cordless handset.

(Control for Avoiding Interference)

In the dual-line setting mode in FIG. 2, as two base phones PA and PB having the same system ID are present, some kind of control for avoiding interference is required. Such control is exerted by Master function unit 63A or 63B and Slave function unit 64A or 64B.

As described above, after the dual-line mode is set, Master side (base phone PA side) basically manages the system, and Slave (base phone PB) performs a response operation solely when an incoming call arrives at Line 2, when Line 2 is designated at the time of making a call, and when Master is busy. Base phone PB recognizes that Master is busy through notification of a busy status from base phone PA via cable 60. Master (base phone PA) recognizes the busy status when Line 1 is being used or Master is operating as a base of INTERCOM communication.

When such a situation is not recognized, CPU 51 of base phone PB serving as Slave only monitors command information 74 in field F4 of packet 70 transmitted/received between the handset and Master (base phone PA), and does not respond to command information 74.

In order to avoid interference, Master/Slave is assumed to operate in accordance with the following principles when one handset performs an operation for calling the base phone or an operation for outside line connection. It is assumed hereinafter that priority line setting data 22E is set to Line 1.

1) Waiting State:

Master: Master monitors command information 74 from the handset in which Auto is designated and command information 74 from the handset in which Line 1 (base phone 1 (base phone PA)) is manually designated. Master serves as Base in a scheme where the Base is interposed, also in communication between the handsets such as INTERCOM between the handsets.

Slave: Slave monitors command information 74 from the handset in which Line 2 (base phone 2 (base phone PB)) is manually designated.

(Processing Procedure in Waiting State)

Figure 8:
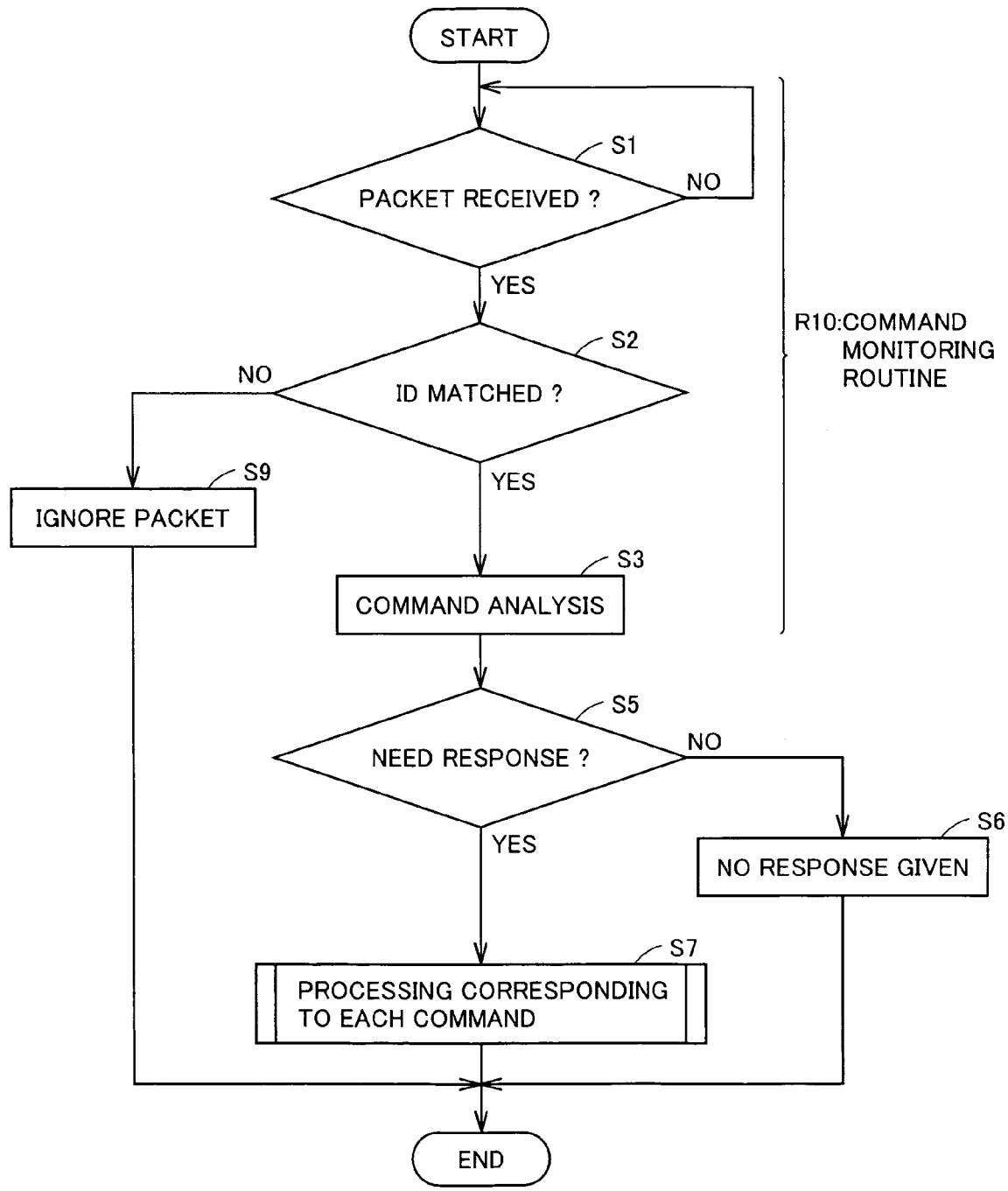
FIG. 8 is a flowchart of processing when the base phone is waiting according to the embodiment.

Master and Slave are normally in the waiting state as described above. In the waiting state, a procedure in accordance with the flowchart in FIG. 8 is performed. When an incoming call arrives from the outside during the procedure in the flowchart, priority is placed on the processing for the call from the outside. Here, for the sake of simplification of description, a processing in the waiting state without taking into account detection of the call from the outside will be described.

Initially, CPU 51 of Master and Slave detects whether or not packet 70 is received from the handset (step S1). When packet 70 is received (YES at S1), whether or not ID data 71 (system ID data 22) stored in field F1 of received packet 70 matches with the system ID data stored in system information storage area 54A (54B) is determined (S2). When there is no match as a result of determination, CPU 51 ignores (does not process but discard) received packet 70 (S9).

On the other hand, if it is determined that the ID data matches with the system ID data (YES at S2), CPU 51 analyzes command information 74 stored in field F4 of received packet 70 in accordance with the prescribed procedure (S3), and determines whether or not some kind of response processing is required, based on a result of analysis (S5). If it is determined that response is not necessary, no response to the received packet is made (S6). On the other hand, if it is determined that response is necessary (YES at S5), a prescribed processing in accordance with the analyzed command is performed (S7). The processing in accordance with the command will be described later.

With regard to base phone PA, for example, when packet 70 storing an INTERCOM communication request, an outside line connection request with Manual designation of Line 1, an Auto outside line connection request, and the like is received, determination that response is necessary is made at S5. With regard to base phone PB, when packet 70 storing an outside line connection request with Manual designation of Line 2 is received, such a determination is made.

Here, as a series of processings from S1 to S3 represent a routine for monitoring received command information 74, it is called a command monitoring routine R10.

2) When the handset is used for a line connection operation and when command information 74 requesting line connection is sent:

2-1) When command information 74 requesting line connection indicates that Line 1 is manually designated a. Line 1 and Line 2 both idle:

Master: Master gives permission to a calling handset through wireless response and connects the handset to Line 1 so as to allow communication through Line 1.

Slave: Though Slave monitors command information 74, no response is given.

b. Line 1 busy/Line 2 idle

Master: Master continues to use Line 1. Master gives rejection response to the handset in a wireless manner.

Slave: Though Slave monitors command information 74, no response is given.

c. Line 2 busy/Line 1 idle

Master: Master gives permission to a calling handset through wireless response and connects the handset to Line 1 so as to allow communication through Line 1.

Slave: Slave continues to use Line 2. Though Slave monitors command information 74, no response is given.

d. Line 1 and Line 2 both busy

Master: Master continues to use Line 1. Master gives rejection response to the handset in a wireless manner.

Slave: Slave continues to use Line 2. Though Slave monitors command information 74, no response is given.

2-2) When command information 74 requesting line connection indicates that Line 2 is manually designated e. Line 1 and Line 2 both idle:

Master: Though Master monitors the command, no response is given.

Slave: Slave gives permission to a calling handset through wireless response and connects the handset to Line 2 so as to allow communication through Line 2.

f. Line 1 busy/Line 2 idle

Master: Master continues to use Line 1. Though Master monitors command information 74, no response is given.

Slave: Slave gives permission to a calling handset through wireless response and connects the handset to Line 2 so as to allow communication through Line 2.

g. Line 2 busy/Line 1 idle

Master: Though Master monitors command information 74, no response is given.

Slave: Slave continues to use Line 2. Slave gives rejection response to the handset in a wireless manner.

h. Line 1 and Line 2 both busy

Master: Master continues to use Line 1. Though Master monitors command information 74, no response is given.

Slave: Slave continues to use Line 2. Slave gives rejection response to the handset in a wireless manner.

(Processing Procedure for Manual Outside Line Connection)

Figure 9:
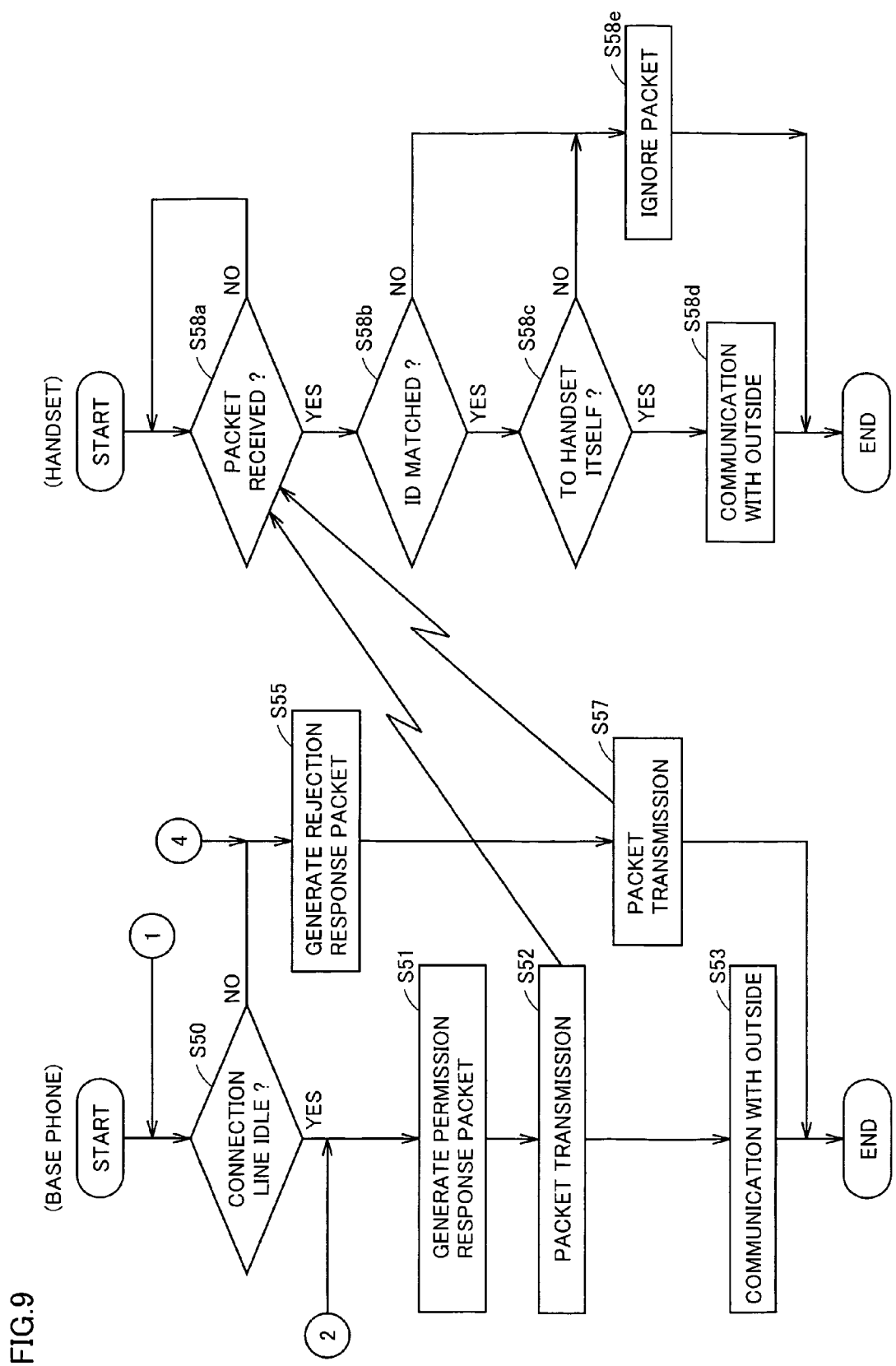
FIG. 9 is a flowchart showing a Manual outside line connection procedure according to the embodiment.

A procedure for manual outside line connection as above will be described with reference to the flowchart in FIG. 9. As a result of command analysis in command monitoring routine R10, when command information 74 of received packet 70 (see FIG. 5G) indicates manual and a line connected to the base phone itself that has received packet 70 is designated as a line to which connection is requested, the procedure as shown in FIG. 9 is performed in the base phone.

Initially, CPU 51 in the base phone determines whether the connected outside line (Line 1 or Line 2) is unused (idle) (S50). If the line is unused (YES at S50), permission response packet 70 is generated (S51).

Permission packet 70 stores the system ID data in field F1, stores handset number data 22A that has been stored in received packet 70 (see FIG. 5G) in field F3, and stores information for permitting outside line connection as command information 74 in field F4. Generated packet 70 is transmitted (S52), and thereafter, a prescribed processing for communication through the outside line is executed (S53).

On the other hand, if the line connected to the base phone is being used (NO at S50), outside line connection rejection packet 70 is generated and transmitted (S55, S57).

Packet 70 stores command information 74 for rejecting outside line connection in field F4 and stores the contents the same as those in packet 70 generated in S51 in other fields.

Each handset in handset group CC receives packet 70 transmitted at S52 or S57.

When each handset receives packet 70 (YES at S58a), the system ID data stored in field F1 of received packet 70 is compared with system ID data 22B stored in the handset, so as to determine whether they match or not (S58b). If the system ID data do not match with each other, the handset ignores packet 70 (S58e). If the system ID data match with each other (YES at S58b), the handset compares handset number data 22A stored in non-volatile RAM 22 with the handset number data stored in field F3 of received packet 70, so as to determine whether or not they match (whether packet 70 is destined to the handset) (S58c). If the handset number data matches with handset number data 22A and it is determined that packet 70 is destined to the handset (YES at S58c), the process moves to the prescribed processing for communication through the outside line (S58d).

On the other hand, if the handset number data does not match with handset number data 22A (it is determined that packet 70 is not destined to the handset), the handset ignores received packet 70 (S58e).

2-3) When command information 74 requesting line connection indicates Auto setting and information for priority line setting i. Line 1 and Line 2 both idle:

When priority line setting information instructs priority on Line 1=similar to a above When priority line setting information instructs priority on Line 2=similar to e above In this case, as Master receives from Slave notification that Line 2 is idle, Master notifies Slave of the line connection request from Line 2 along with handset number data 22A of a request-originating handset. Slave thus operates in a manner similar to e above.

j. Line 1 busy/Line 2 idle

Similar to f above. In this case, when Master notifies Slave of a busy status, Master receives from Slave notification that Line 2 is idle. Therefore, Master detects that Line 2 is idle. In response to this detection, Master notifies Slave of the request for line connection to Line 2, along with handset number data 22A of the request-originating handset. As a result, Slave operates in a manner similar to f above.

k. Line 2 busy/Line 1 idle

Similar to c above.

l. Line 1 and Line 2 both busy

When priority line setting information instructs priority on Line 1=similar to d above When priority line setting information instructs priority on Line 2=similar to h above In this case, Master notifies Slave of the request for line connection to Line 2, along with handset number data 22A of the request-originating handset. Slave thus operates in a manner similar to h above.

(Procedure for Line Connection in Auto)

An operation when Line 1 is idle while command information 74 requesting line connection in packet 70 from the handset indicates information for AUTO and the priority line setting will now be described. Here, the information for the priority line setting of the command information in packet 70 is set using priority line setting data 22E in the handset.

Figure 10:
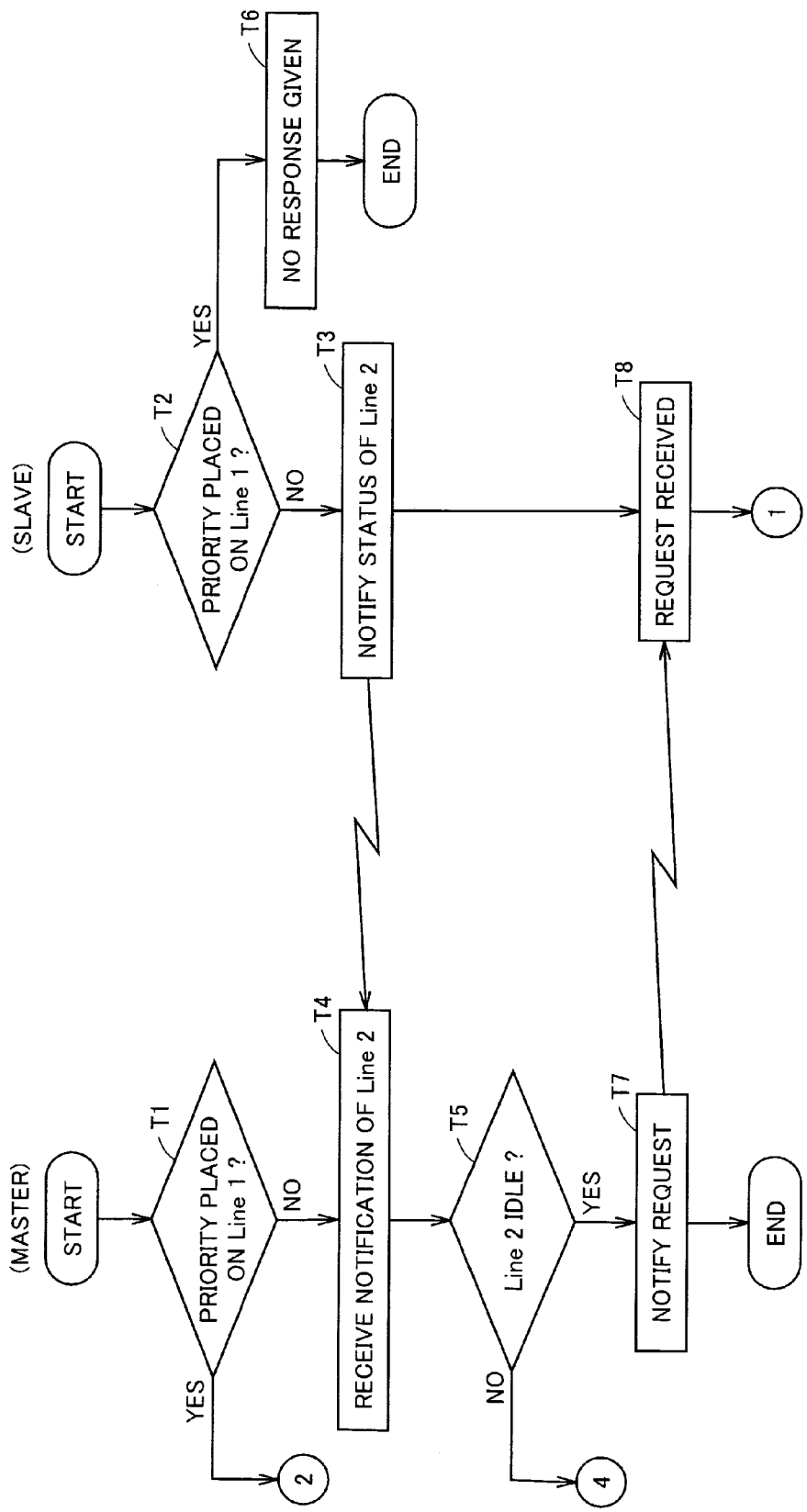
FIGS. 10 and 11 are flowcharts showing an Auto outside line connection procedure according to the embodiment.

When Master determines that command information 74 in received packet 70 in FIG. 5G indicates AUTO setting in command monitoring routine R10, Master executes the processing flowchart in FIG. 10 as a corresponding processing.

Initially, base phone PA serving as Master determines whether or not priority line setting information indicated by command information 74 of received packet 70 indicates Line 1 (step T (hereinafter, simply abbreviated as T) 1). If Line 1 is indicated as a result of determination, the processing at S51 and later in FIG. 9 will be executed.

On the other hand, if the priority line setting does not indicate Line 1 (indicates Line 2), the process proceeds to T4.

Here, base phone PB serving as Slave also receives packet 70, and performs the processing at T2 through command monitoring routine R10. Whether or not command information 74 indicates Line 1 as the priority line setting information is determined (T2). If Line 1 is indicated, no response is given to packet 70 (T6) and the processing ends. On the other hand, if Line 1 is not indicated as the priority line (Line 2 is indicated) (NO at T2), CPU 51 in base phone PB detects a status of Line 2 (used/unused (idle)) and transmits notification of a result of detection to Master (T3).

When Master receives notification of the status of Line 2 from Slave (T4), Master determines whether Line 2 is idle or not, based on the received status notification (T5). If Line 2 is determined as idle (YES at T5), notification of the request for line connection is transmitted to Slave (T7). On the other hand, if Line 2 is determined as not idle (NO at T5), the processing at S55 and later in FIG. 9 will be executed.

When base phone PB serving as Slave receives request notification transmitted from base phone PA serving as Master (T8), base phone PB performs the processing at S50 in FIG. 9.

Figure 11:
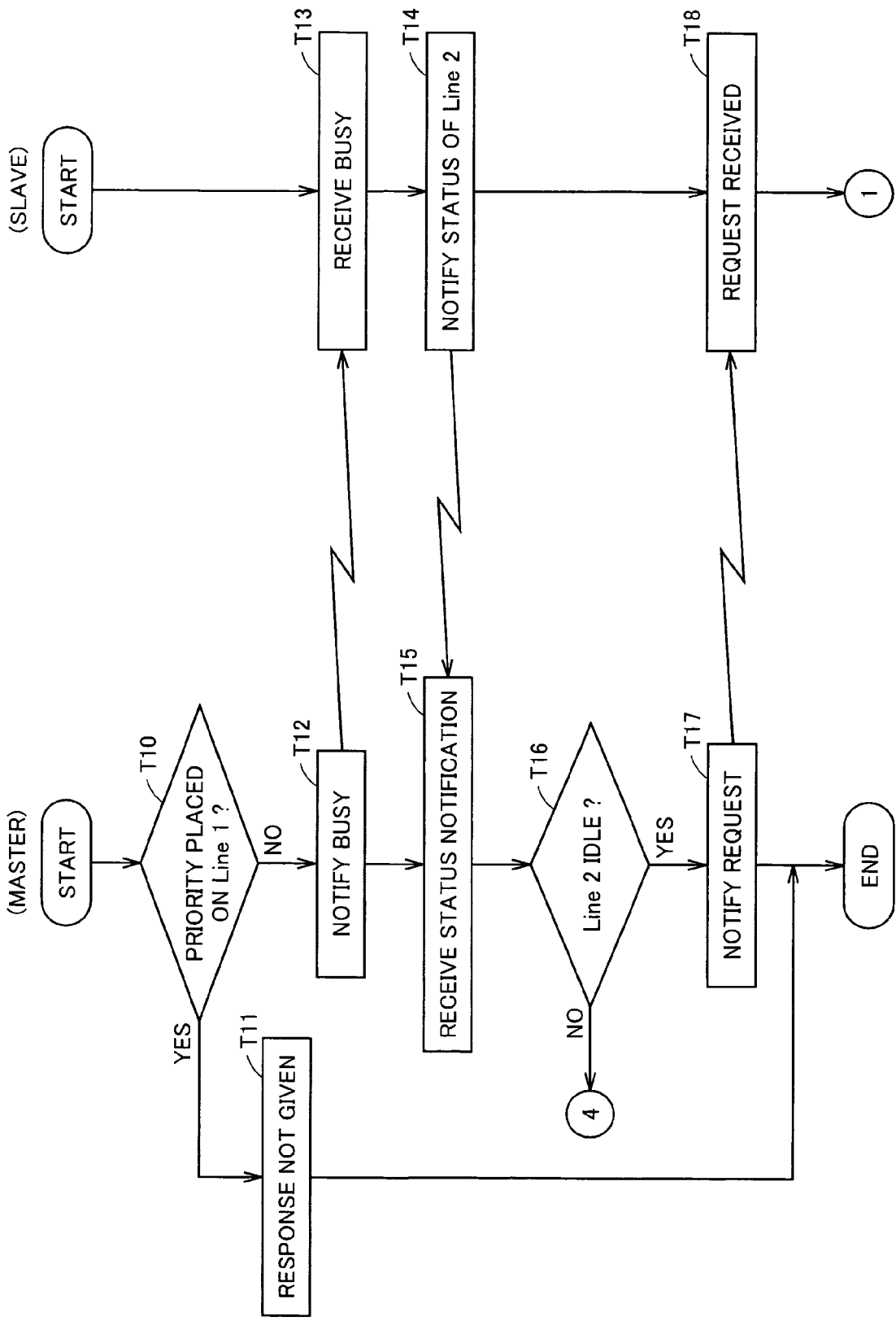

An operation when Line 1 is busy while command information 74 requesting line connection indicates Auto setting and information for the priority line setting will now be described with reference to FIG. 11.

Base phone PA serving as Master executes the processing at T10 through command monitoring routine R10. First, whether or not the priority line setting data indicates Line 1 is determined based on command information 74 in received packet 70 (T10). If Line 1 is indicated (YES at T10), Line 1 is currently used. Therefore, no response to packet 70 is made (T11) and the process ends.

On the other hand, if it is determined that the priority line setting data does not indicate Line 1 (indicates Line 2) (NO at T10), busy notification indicating that Line 1 is busy is transmitted to base phone PB serving as Slave (T12).

Meanwhile, though base phone PB serving as Slave also receives packet 70 and executes command monitoring routine R10, it is determined that no response is given as a result of analysis of command information 74. Therefore, no response is given. Here, base phone PB receives busy notification from base phone PA serving as Master (T13). Accordingly, base phone PB detects the status of Line 2 connected to base phone PB in response to reception, and transmits notification of the status indicating the result of detection to base phone PA serving as Master (T14).

As Master receives notification of the status of Line 2 from Slave (T15), Master determines whether Line 2 is unused (idle) based on the received notification of the status (T16). If it is determined that Line 2 is also used (NO at T16), the process at S55 in the flowchart in FIG. 9 is executed.

On the other hand, if it is determined that Line 2 is unused (YES at T16), notification of the request for line connection is transmitted to base phone PB serving as Slave (T17).

Base phone PB serving as Slave receives notification of the request for line connection from base phone PA serving as Master (T18), and executes the processing at S50 and later in FIG. 9 with respect to packet 70 from the handset received through command monitoring routine R10.

3) When a call arrives at Line 1

Master transmits to each handset, packet 70 in FIG. 5F containing command information 74 indicating that a call has arrived at each handset through Line 1. Accordingly, each handset starts ringing of buzzer 14 based on command information 74 in received packet 70. Slave also receives a command indicating that a call has arrived through Line 1 from Master, and starts ringing of a bell or the like using telephone function unit 46B in a manner the same as in other handset while a message that "call has arrived at Line 1" is shown (by voice/by display), based on the received command. Here, a command for line connection is issued to Master from a terminal (handset) where the response operation (pressing of a TALK key on keyboard 11, for example) has bee performed.

4) When a call arrives at Line 2

Slave transmits to each handset, packet 70 in FIG. 5F containing command information 74 indicating that a call has arrived at each handset through Line 2. Accordingly, upon receiving packet 70, each handset starts ringing of buzzer 14 based on received command information 74. Master also receives a command indicating that a call has arrived through Line 2 from Slave, and starts ringing of a bell or the like using telephone function unit 46B in a manner the same as in other handset while a message that "call has arrived at Line 2" is shown (by voice/by display), based on the received command. Here, a command for line connection is issued to Slave from a terminal (handset) where the response operation (pressing of the TALK key on keyboard 11, for example) has been performed.

(Processing Procedure when Call has Arrived at Outside Line)

Figure 12:
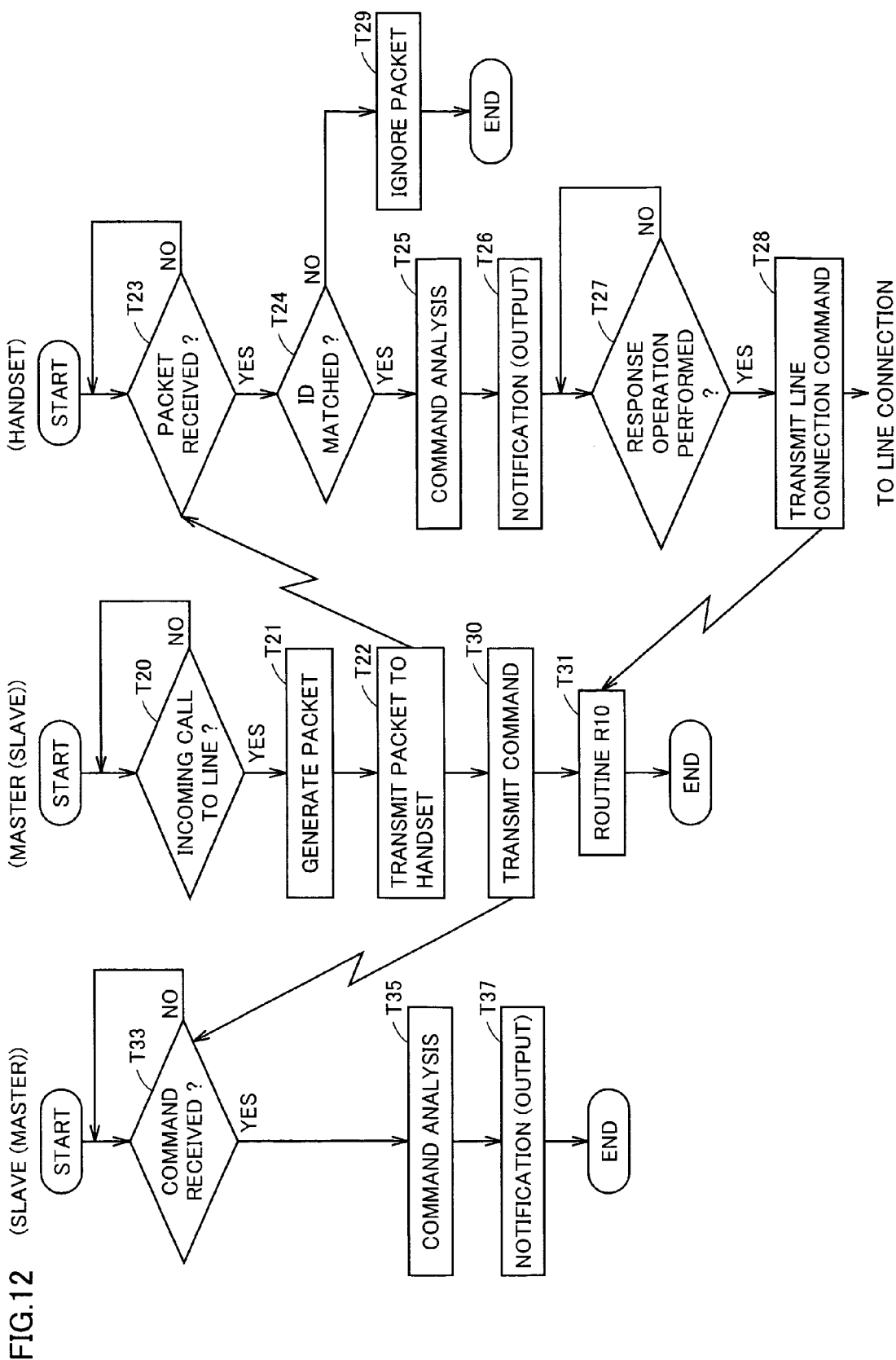
FIG. 12 is a flowchart showing a procedure when an incoming call from the outside arrives according to the embodiment.

When a call has arrived at an outside line (Line 1 or Line 2), base phone PA serving as Master and base phone PB serving as Slave operate in a similar manner. This operation will be described with reference to the processing flowchart in FIG. 12, assuming that a call from the outside has arrived to Line 2 connected to base phone PB serving as Slave.

CPU 51 in base phone PB determines whether or not a call has arrived at outside Line 2 connected to base phone PB (T20). If it is determined that the call has arrived (YES at T20), packet 70 in FIG. 5F is generated (T21) and transmitted to each handset (T22).

Upon receiving packet 70 (YES at T23), each handset determines whether or not the system ID data in field F1 matches with system ID data 22B stored in non-volatile RAM 22 (T24) based on the contents in received packet 70. If the system ID data does not match with system ID data 22B, the packet is ignored (T29).

On the other hand, if the system ID data matches with system ID data 22B, it is determined that packet 70 is destined to the handset based on data BD in field F3 in received packet 70, and command information 74 in field F4 is analyzed in the later processing (T25). Based on a result of analysis, a notification (output) operation is performed (T26).

When it is determined that the user has performed a response operation through keyboard 11 or the like in response to notification (YES at T27), packet 70 in FIG. 5I storing the command requesting line connection in field F4 is transmitted (T28). Thereafter, base phone PB connects the line between Line 2 and the handset so as to establish communication based on the contents in packet 70, whereby communication with the outside is established.

Returning to the operation of base phone PB, after packet 70 is transmitted to the handset (T22), CPU 51 in base phone PB transmits to the other base phone PA a command indicating that the incoming call has arrived at outside Line 2 (T30). Then, CPU 51 in base phone PB executes command monitoring routine R10 (T31), and waits for reception of packet 70 containing the line connection request command from the handset.

Upon receiving the command transmitted at T30 (YES at T33), base phone PA analyzes the received command, and provides notification (output) that "incoming call has arrived at outside Line 2" based on the result of analysis (T35, T37).

5) When calls arrive at Line 1 and Line 2 at the same time:

The operation in accordance with the manner in sections 3) and 4) described above is performed.

Each handset, Master (=base phone PA), and Slave (=base phone PB) know that calls have arrived at both lines through display, sound or the like. In each handset, a response operation including an operation to select which call to be responded is performed through keyboard 11. Packet 70 storing command information 74 of the line connection command is transmitted to Master from the handset where the response operation has been performed when Line 1 is selected, or the packet is transmitted to Slave when Line 2 is selected.

6) When requests for use of the resources conflict

When a call arrives at Line 2 while FAX communication is carried out through Line 1, connection to Line 2 is made. In such a case, when it is detected that a calling party requests FAX communication, that is, when requests for use of the resource (FAX function unit 47) conflict, the following operation is performed. Here, request for FAX communication is detected by reception through Line 2 of a signal indicating that the call is directed for FAX transmission, for example, a CNG signal. CNG signal represents a signal repeating a pattern of 1100 Hz for 0.5 sec and pause for 2 sec. The CNG signal is transmitted until an instrument from which the FAX communication request is issued receives a response using a FAX reception signal from base phone PB.

If the requests for use conflict as above, in the conventional terminal simply connected to two lines (the terminal other than that including independent FAX function units for Line 1 and Line 2), there is only one FAX function available even though the FAX function is provided. Therefore, FAX communication through Line 2 is set to the waiting state until FAX communication through Line 1 is completed.

In contrast, terminal PP in FIG. 2 having the dual-line setting mode set according to the present embodiment includes Master having FAX function unit 47A and Slave having FAX function unit 47B. Therefore, terminal PP can receive the request for FAX communication that arrived at Line 2 without delay and start FAX communication. This is also the case for the answering and recording function.

In other words, in the conventional terminal simply connected to two lines (the terminal other than that including independent FAX function units for Line 1 and Line 2), there is only one answering and recording function available even though the answering and recording function is provided. Therefore, the call through Line 2 is set to the waiting state until the call through Line 1 is completed.

In contrast, terminal PP in FIG. 2 having the dual-line setting mode set according to the present embodiment includes Master having answering and recording function unit 48A and Slave having answering and recording function unit 48B. Therefore, terminal PP can receive the call request that arrived at Line 2 without delay and start recording of the message.

In this manner, a system without keeping the request waiting can be constructed with terminal PP, even if requests for use of the identical function unit (resource) simultaneously occur in two lines.

(Canceling of Dual-Line Setting Mode)

Figure 13:
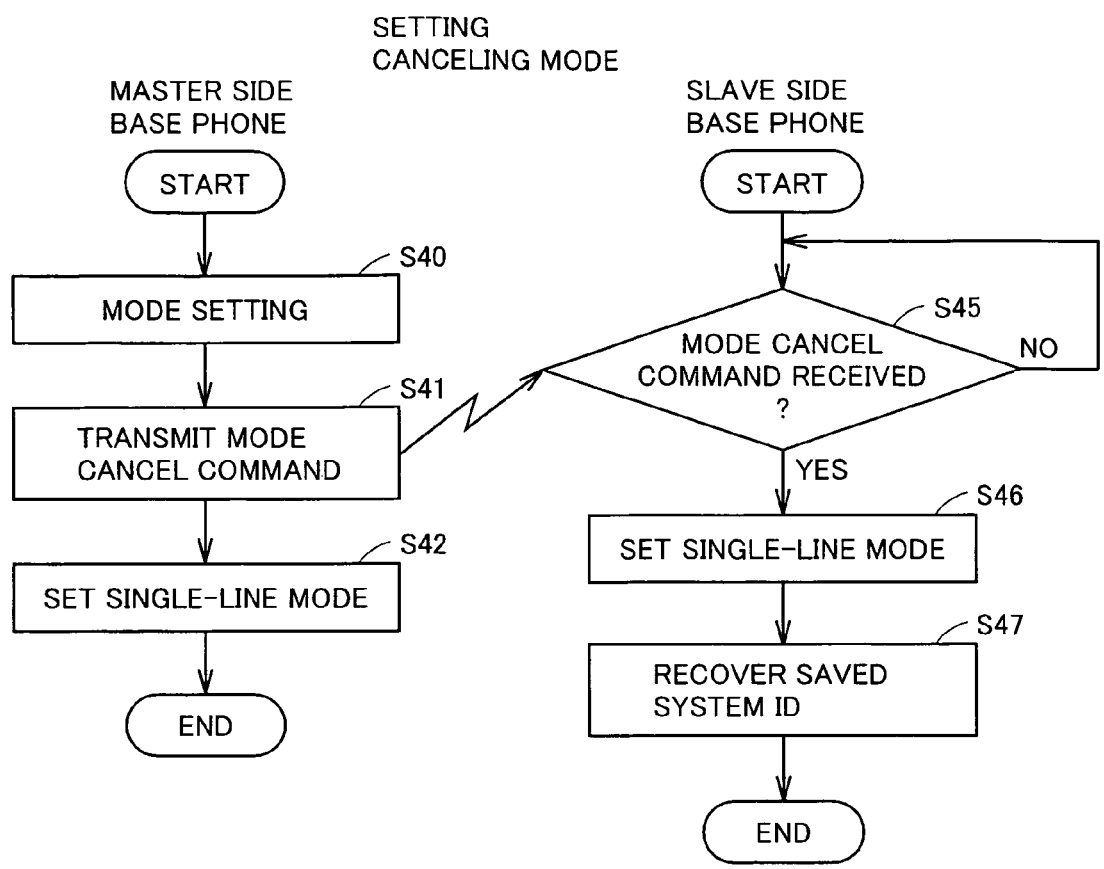
FIG. 13 is a flowchart of processing for canceling the dual-line setting mode according to the embodiment.

As to the base phone in which Master function unit 63A (63B) or Slave function unit 64A (64B) in dual-line adaptation function unit 62A (62B) is activated through the dual-line setting mode, a setting canceling mode for canceling the dual-line setting mode and activating original single-line adaptation function unit 61A (61B) will be described with reference to the procedure shown in FIG. 13.

As shown in FIG. 2, an environment after the dual-line setting mode where base phone PA serves as Master and base phone PB serves as Slave has been set is assumed. In order to cancel this dual-line setting mode environment, the following processing is performed.

Initially, base phone PA serving as Master operates as follows. First, the user instructs canceling of the dual-line setting mode through the operation of keyboard 44 (S40). CPU 51 in base phone PA transmits a command to instruct canceling of the dual-line setting mode to base phone PB through cable 60, based on the input of the instruction (S41).

Thereafter, in base phone PA, single-line adaptation function unit 61A is activated instead of Master function unit 63A in dual-line adaptation function unit 62A. Thereafter, an operation in accordance with single-line adaptation function unit 61A is performed (S42).

Upon receiving the dual-line setting mode cancel command from base phone PA through cable 60 (YES at S45), base phone PB activates single-line adaptation function unit 61B instead of Slave function unit 64B in dual-line adaptation function unit 62B (S46). Then, base phone PB reads the original system ID from system information save area 55B and stores the same in system information storage area 54B (S47). The system ID used for authentication in communication is thus recovered to its original ID. The user performs a prescribed operation through keyboard 44 so as to read the contents in system information storage area 54B for display on LCD 43.

When the dual-line setting mode is cancelled through the procedure described above, the following operation is performed for each handset. Specifically, each handset in handset group CC that has been used in the dual-line setting mode shares the system ID of base phone PA. That is, all handsets are subordinate to base phone PA. Here, the user selects handsets to be subordinate to base phone PA and base phone PB from handset group CC respectively, and thereafter, the user inputs handset number data 22A and system ID 22B common to that of the base phone to which the handset should be subordinate through keyboard 11, so as not to cause duplicated data. CPU 51 stores input handset number data 22A and system ID 22B in non-volatile memory 22. Thereafter, the user operates keyboard 44 of each base phone, and inputs handset number data 22A of all handsets subordinate to that base phone. Therefore, CPU 51 registers input handset number data 22A as handset data 56A (56B). Then, the user disconnects cable 60.

In this manner, the state shown in FIGS. 1A and 1B is recovered.

(Registration of New Handset)

Figure 14:
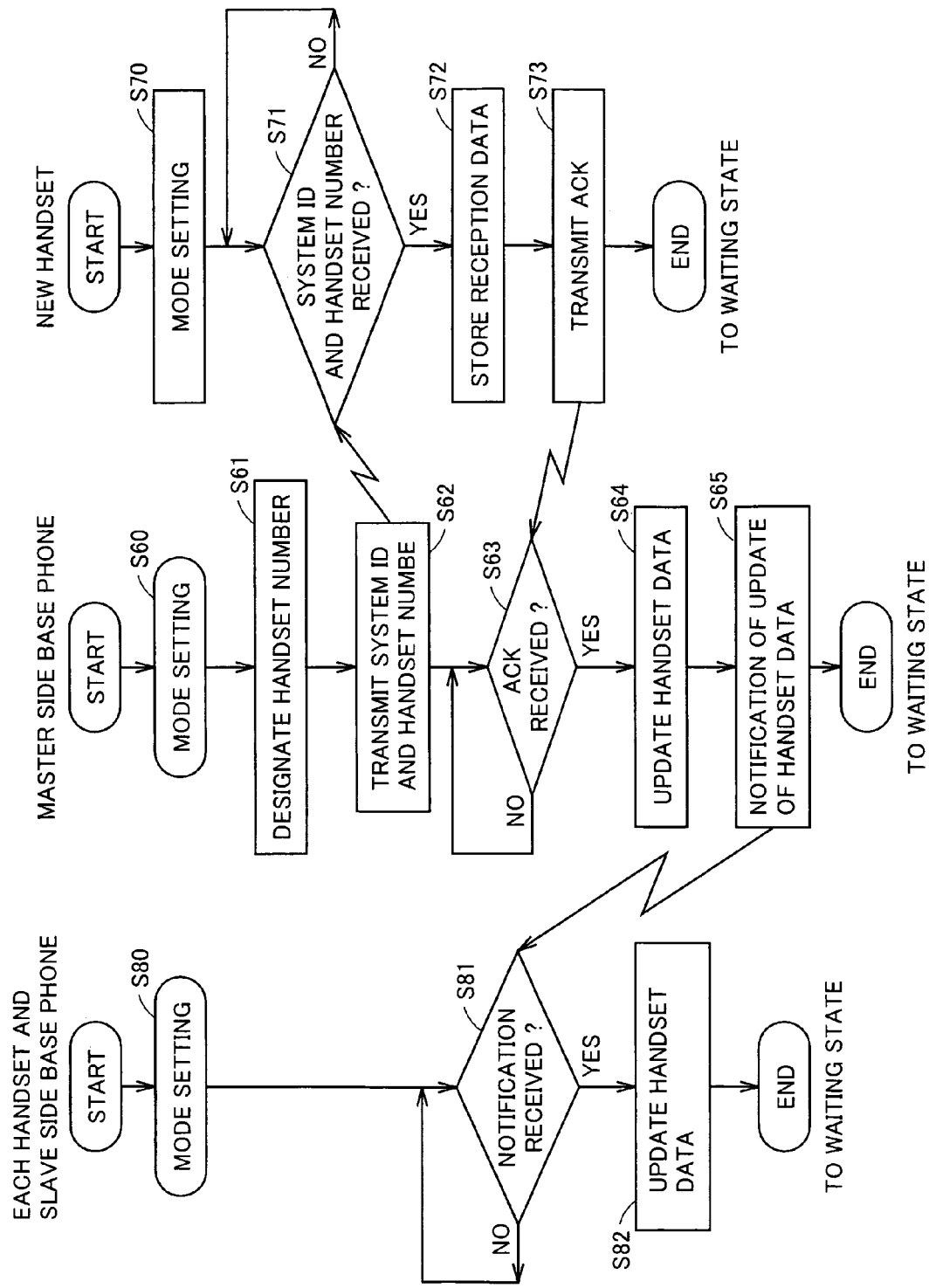
FIG. 14 is a flowchart of processing in a handset registration mode according to the embodiment.

A procedure for newly registering a handset in the dual-line setting mode in FIG. 2 will be described, following the procedure in FIG. 14.

First, each of base phone PB and base phone PB, a handset to be newly registered, and each handset in handset group CC are set to a "handset registration mode" in response to an instruction through the operation of keyboard 44 or 111 by the user (S60, S70, S80).

In base phone PA serving as Master, the user designates a type of a handset number designation mode (manual/automatic) through keyboard 44. Here, manual refers to designation of any handset number (handset number data 22A) to the handset to be newly registered, while automatic refers to automatic allotment of a handset number (handset number data 22A) to the handset to be newly registered sequentially from a smaller number among unused numbers.

When the handset number is input through the operation of keyboard 44 in base phone PA serving as Master by the user (S61), CPU 51 transmits packet 70 in FIG. 5D storing the system ID read from system information storage area 54A and the input handset number as command information 74 to the handset (S62). Here, a radio channel (=a frequency) used for transmission of packet 70 is prescribed for handset registration. Information for specifying the prescribed channel is stored in the memory of the base phone in advance at the time of shipment from the factory. A common prescribed channel is allotted to the same system ID. That is, the prescribed channel is different for each system ID.

Upon receiving packet 70 through RF communication unit 17 within a defined time period (YES at S71), the new handset once stores packet 70 in work space RAM 21, and replies to a sender base phone by returning packet 70 in FIG. 5E storing ACK for notification of successful reception (S72). Then, CPU 20 stores the system ID once stored in work space RAM 21 and the handset number as system ID 22B and handset number data 22A respectively in non-volatile RAM 22.

Upon receiving packet 70 storing ACK from the newly registered handset (YES at S63), base phone PA updates its handset data 56A with the handset number of the newly added handset (S64).

Then, in order to notify the other base phone PB of updated handset data 56A, base phone PA notifies base phone PB of a handset data update command containing the updated handset data through cable 60, and transmits packet 70 storing updated handset data 56A and a command instructing update of other handset data 22D also to each handset in handset group CC (S65).

Upon receiving notification of handset data update (YES at S81), base phone PB updates its handset data 56B with received, updated handset data 56A, and each handset also updates other handset data 22A in accordance with the contents in packet 70 received from base phone PA (S82). Consequently, handset data 56A of base phone PA, handset data 56B of base phone PB, and other handset data 22D of all handsets including the newly registered handset are updated so as to include handset number data 22A of the newly registered handset.

After the processing as above is completed, each base phone and each handset make a transition to the waiting state.

Though handset number data 22A of the newly registered handset is determined in base phone PA, the present embodiment is not limited thereto. For example, the following example is possible. Specifically, the handset number input by the user through keyboard 11 of the new handset is transmitted to base phone PA, and base phone PA compares the received handset number with handset data 56A. If it is determined that the handset number is not the same as handset number data 22A allotted to the existing handset, base phone PA transmits a command of "approval" to the new handset, and the handset number may be registered as handset number data 22A of the new handset.

Yet Other Embodiments

The embodiment described above shows the digital cordless telephone set by way of example. The applicable instrument, however, is not limited to the telephone set, and the embodiment is applicable to a variety of digital cordless terminals. If the function according to the present embodiment is incorporated in the digital cordless terminal, it is merely necessary in terms of hardware modification to attach connector 42 for connecting terminals via cable 60. As other modification can be handled in software, the function can be achieved with low cost.

In addition, though two lines are connected in FIG. 2, three lines or more may be connected. In such a case, connector 42 will be improved such that two or more base phones can be connected to base phone P.

Moreover, though at least one handset is subordinate to base phone PA or PB or terminal PP in each embodiment, the number of handsets subordinate thereto respectively may be set to zero. In such a case, a call is made using telephone function unit 46A (or 46B) in each base phone.

Here, update using the system ID for the single-line adaptation function and the system ID for the dual-line adaptation function is performed so that the system ID is used in common among all base phones and all handsets by means of the dual-line setting mode. The common use of the system ID by means of the dual-line setting mode, however, may be omitted. In such a case, the system ID of a communication counterpart instrument of each handset and each base phone (handset or base phone) is used for communication such as calling.

Effect of Each Embodiment

According to the embodiment described above, the digital cordless telephone set adapted to a single line shown in FIG.

1A or 1B is marketed, incorporating dual-line adaptation function unit 62A (or 62B) for the dual-line setting mode as an expansion function for the base phone of the telephone set. As the dual-line adaptation function has conventionally been provided solely in a dedicated product, the dual-line-adapted digital cordless telephone system can readily be provided with low cost.

In addition, in the telephone set in each embodiment described above, functions such as improvement in RF module 50 and attachment of a connector for connecting to cable 60 are simply added to the existing single-line digital cordless telephone set, so as to achieve the dual-line-adapted telephone set.

Moreover, types of the function units included in additional function unit 45 in the single-line-adapted base phone are increased, so that different types of the function units are added to each base phone. In this manner, the user who desires the dual-line-adapted system combines the base phones so as to obtain the function units of the type and the number he/she desires. Thus, the dual-line system readily satisfying the demand can be provided.

In the instrument incorporating the dual-line system in one housing, only one answering and recording function or only one FAX function has conventionally been provided for two lines. Therefore, if requests for these functions arrive at the two lines at the same time, one request is processed using the function unit, whereas the other request should wait until the processing is completed. In contrast, according to the present embodiment, independent two instruments (base phones) are employed. Therefore, when a model incorporating these function units for two base phones respectively is selected, both requests can be processed in parallel without delay, even if requests for the function unit of the same type simultaneously arrive at two lines.

For example, it is assumed that the user who has used only one base phone having dual-line adaptation function unit 62A (or 62B) additionally provides one line for the office, so as to introduce the dual-line system. In such a case, if the user purchases another base phone having dual-line adaptation function unit 62A (or 62B), effective use of the existing instrument can be achieved, without throwing away the same.

In this manner, independent development of the telephone set of the dual-line-adapted model is no longer necessary. Demands from the user not requiring the single-line system and the user requiring the dual-line system can be satisfied with a single telephone set.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A telephone system communicating though a plurality of external telephone lines, comprising:
    a plurality of single-line telephone base units, each telephone base unit having a telephone circuit providing telephone functions including establishing connection with a respective telephone line and producing ringing sounds in response to a calling request, and having a line jack for plugging in a respective said telephone line; and
    a communication path for connecting said plurality of telephone base units so as to allow communication between them, each telephone base unit having a connector, that is separate from the line jack, for connection to the communication path; wherein
    each of said plurality of single-line telephone base units further includes
    a multiple-line adaptation unit for communicating with at least one other of said multiple-line adaptation units over said communication path in order to establish communication though said plurality of telephone lines, and
    a single-line adaptation unit for establishing communication though said telephone line connected to the terminal itself, without using said communication path, and wherein
    a single-line telephone base unit of said plurality of single-line telephone base units selectively performing one of:
        (a) setting a connected state for said communication path in order to enable said multiple-line adaptation unit and
        (b) canceling said connected state by deactivating said communication path in order to enable said single-line adaptation unit in response to an external operation.

2. The telephone system according to claim 1, wherein each of said plurality of telephone base units further includes an additional function unit, and
    when a plurality of requests for use of said additional function unit arrive through said plurality of telephone lines while said multiple-line adaptation unit is enabled, said plurality of requests for use are processed in said plurality of terminals by said additional function unit respectively.

3. The telephone system according to claim 2, wherein a type and number of said additional function unit is different for each of said plurality of telephone base units.

4. The telephone system according to claim 1, further comprising at least one handset establishing wireless communication with said plurality of connected single-line telephone base units.

5. The telephone system according to claim 4, wherein said multiple-line adaptation unit connects any one of said plurality of telephone lines to said handset so as to allow communication between said handset and a telephone line of another single-line telephone base unit, the another single-line telephone base unit communicating with the base unit having the multiple-line adaptation unit through said communication path, when a line connection request is received from said handset.

6. The telephone system according to claim 5, wherein said line connection request includes information for designating a line, and
    said multiple-line adaptation unit in each of said plurality of telephone base units connects said telephone line to said handset so as to allow communication therebetween, when said line designation information of received said line connection request designates said telephone line connected to said telephone base unit including the multiple-line adaptation unit.

7. The telephone system according to claim 4, wherein each of said plurality of telephone base units and each of said handsets have an identifier used for authentication in communication allotted, so that communication between instruments having a common identifier is allowed.

8. The telephone system according to claim 7, wherein each of said plurality of telephone base units has different said identifier allotted when said single-line adaptation unit is enabled.

9. The telephone system according to claim 7, wherein when said multiple-line adaptation unit is enabled in said plurality of telephone base units, all of said plurality of telephone base units and all of said handsets have common said identifier allotted.

10. The telephone system according to claim 7, wherein
when said multiple-line adaptation unit is enabled in each of said plurality of telephone base units, any one of said plurality of telephone base units is designated as master and other telephone base unit is designated as slave, and
said telephone base unit further includes
master identifier transmission means for transmitting said identifier allotted to the telephone base unit itself when said telephone base unit is designated as said master, and
slave identifier update means for updating the identifier previously allotted to the telephone base unit itself so as to indicate said identifier received from said master identifier transmission means when said telephone base unit is designated as said slave.

11. The telephone system according to claim 10, wherein
said telephone base unit further includes slave identifier transmission means for transmitting said identifier received from said master identifier transmission means to at least one handset having an identifier same as the identifier previously allotted to the telephone base unit itself when said telephone base unit is designated as said slave, and
said handset includes handset identifier update means for receiving said identifier transmitted by said slave identifier transmission means and updating the identifier previously allotted to the telephone base unit itself so as to indicate received said identifier.

12. The telephone system according to claim 10, wherein
said telephone base unit further includes means for updating the identifier allotted to the telephone base unit itself so as to indicate the original identifier, when said single-line adaptation unit is enabled instead of said multiple-line adaptation unit after said telephone base unit is designated as said slave.

13. The telephone system according to claim 10, wherein
when said handset is newly registered in said telephone system, said telephone base unit designated as said master transmits a command for allotting said common identifier to said handset newly registered.

14. The telephone system according to claim 10, wherein
when an unused line connection request with regard to an unused line is received from said handset, said multiple-line adaptation unit in said telephone base unit designated as said master connects the unused telephone line detected out of said plurality of telephone lines to the handset so as to allow communication therebetween.

15. The telephone system according to claim 14, wherein
said unused line connection request includes a line selection instruction information for instructing a line to be selected, and
when it is detected that there are at least two unused telephone lines, said multiple-line adaptation unit in said telephone base unit designated as said master connects the telephone line selected based on said line selection instruction information of said unused line connection request received from said handset to the handset so as to allow communication therebetween.

16. The telephone system according to claim 14, wherein
said multiple-line adaptation unit in said telephone base unit designated as said master receives notification indicating whether said telephone line connected to said telephone base unit is being used from each said telephone base unit designated as said slave.

17. The telephone system according to claim 10, wherein
each said handset includes storage means for storing handset data for identifying itself and instrument data for specifying an originator handset and a destination handset.

18. The telephone system according to claim 17, wherein
when said handset is newly registered in said telephone system, said telephone base unit designated as said master transmits a command for allotting said handset data to said handset newly registered.

19. A telephone system communicating through a plurality of external telephone lines, comprising:
a plurality of terminals connected to said plurality of telephone lines respectively;
at least one handset in communication with said plurality of terminals; and
a communication path for connecting said plurality of terminals so as to allow communication between them;
wherein
each of said plurality of terminals includes
an identifier,
a multiple-line adaptation unit for establishing communication through said plurality of telephone lines using said communication path, and
a single-line adaptation unit for establishing communication through said telephone line connected to the terminal itself, without using said communication path,
wherein
one of said multiple-line adaptation unit and said single-line adaptation unit is selectively enabled in response to an external operation,
wherein
when said multiple-line adaptation unit is enabled in each of said plurality of terminals, any one of said plurality of terminals is designated as master and other terminal is designated as slave, and
each of said plurality of terminals further includes
master identifier transmission means for transmitting said identifier allotted to the terminal itself when said terminal is designated as said master, and
slave identifier update means for updating the identifier previously allotted to the terminal itself so as to indicate said identifier received from said master identifier transmission means when said terminal is designated as said slave,
wherein
each of said plurality of terminals further includes slave identifier transmission means for transmitting said identifier received from said master identifier transmission means to said at least one handset having an identifier same as the identifier previously allotted to the terminal itself when said terminal is designated as said slave, and
said at least one handset includes handset identifier update means for receiving said identifier transmitted by said slave identifier transmission means and updating the identifier previously allotted to the terminal itself so as to indicate received said identifier.

20. A telephone system communicating through a plurality of external telephone lines, comprising:
a plurality of terminals connected to said plurality of telephone lines respectively;
at least one handset establishing wireless communication with said plurality of terminals, using said plurality of terminals as base phones respectively; and
a communication path for connecting said plurality of terminals so as to allow communication between them;

wherein
each of said plurality of terminals includes
a multiple-line adaptation unit for establishing communication through said plurality of telephone lines using said communication path, and
a single-line adaptation unit for establishing communication through said telephone line connected to the terminal itself, without using said communication path,
wherein
one of said multiple-line adaptation unit and said single-line adaptation unit is selectively enabled in response to an external operation,
wherein
each of said plurality of terminals and each of said handsets have an identifier used for authentication in communication allotted, so that communication between instruments having a common identifier is allowed,
wherein
when said multiple-line adaptation unit is enabled in each of said plurality of terminals, any one of said plurality of terminals is designated as master and other terminal is designated as slave, and
said terminal further includes
master identifier transmission means for transmitting said identifier allotted to the terminal itself when said terminal is designated as said master, and
slave identifier update means for updating the identifier previously allotted to the terminal itself so as to indicate said identifier received from said master identifier transmission means when said terminal is designated as said slave,
wherein
each said handset includes storage means for storing handset data for identifying itself and instrument data for specifying an originator handset and a destination handset,
wherein
said terminal further includes
first slave side handset data transmission means for transmitting said handset data of at least one handset having an identifier same as the identifier previously allotted to the terminal itself when said terminal is designated as said slave, and
first master side handset data transmission means for transmitting said handset data received from said first slave side handset data transmission means to at least one handset having an identifier same as said identifier allotted to the terminal itself when said terminal is designated as said master, and
said handset includes first instrument data update means for updating said instrument data in said storage means so as to include said handset data received from said first master side handset data transmission means.

21. A telephone system communicating through a plurality of external telephone lines, comprising:
a plurality of terminals connected to said plurality of telephone lines respectively;
at least one handset establishing wireless communication with said plurality of terminals, using said plurality of terminals as base phones respectively; and
a communication path for connecting said plurality of terminals so as to allow communication between them;
wherein
each of said plurality of terminals includes
a multiple-line adaptation unit for establishing communication through said plurality of telephone lines using said communication path, and
a single-line adaptation unit for establishing communication through said telephone line connected to the terminal itself, without using said communication path,
wherein
one of said multiple-line adaptation unit and said single-line adaptation unit is selectively enabled in response to an external operation,
wherein
each of said plurality of terminals and each of said handsets have an identifier used for authentication in communication allotted, so that communication between instruments having a common identifier is allowed,
wherein
when said multiple-line adaptation unit is enabled in each of said plurality of terminals, any one of said plurality of terminals is designated as master and other terminal is designated as slave, and
said terminal further includes
master identifier transmission means for transmitting said identifier allotted to the terminal itself when said terminal is designated as said master, and
slave identifier update means for updating the identifier previously allotted to the terminal itself so as to indicate said identifier received from said master identifier transmission means when said terminal is designated as said slave,
wherein
each said handset includes storage means for storing handset data for identifying itself and instrument data for specifying an originator handset and a destination handset, wherein
said terminal further includes
second master side handset data transmission means for transmitting said handset data of at least one handset having an identifier same as said identifier allotted to the terminal itself when said terminal is designated as said master, and
second slave side handset data transmission means for transmitting said handset data received from said second master side handset data transmission means to at least one handset having an identifier same as the identifier previously allotted to the terminal itself when said terminal is designated as said slave, and
said handset includes second instrument data update means for updating said instrument data in said storage means so as to include said handset data received from said second slave side handset data transmission means.

22. The telephone system according to claim 21, wherein said second slave side handset data transmission means includes
comparison means for comparing said handset data received from said second master side handset data transmission means with handset data of at least one handset having an identifier same as the identifier previously allotted to the terminal itself and
duplication resolving means for resolving duplication of said handset data when a result of comparison by said comparison means indicates duplication of said handset data among different said handsets.

23. The telephone system according to claim 1, wherein each said multiple-line adaptation unit establishes communication through said plurality of telephone lines plugged into the line jack of corresponding said plurality of single-line telephone base units.

* * * * *